United States Patent
Ke

(10) Patent No.: US 10,140,026 B2
(45) Date of Patent: Nov. 27, 2018

(54) DATA STORAGE DEVICE AND DATA MAINTENANCE METHOD THEREOF

(71) Applicant: Silicon Motion, Inc., Jhubei, Hsinchu County (TW)

(72) Inventor: Kuan-Yu Ke, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 124 days.

(21) Appl. No.: 15/286,925

(22) Filed: Oct. 6, 2016

(65) Prior Publication Data
US 2017/0109042 A1    Apr. 20, 2017

(30) Foreign Application Priority Data

Oct. 15, 2015  (TW) .............. 104133817 A

(51) Int. Cl.
G06F 3/06        (2006.01)
G06F 12/02       (2006.01)
G06F 12/0871     (2016.01)

(52) U.S. Cl.
CPC ............ G06F 3/061 (2013.01); G06F 3/0655 (2013.01); G06F 3/0679 (2013.01); G06F 12/0246 (2013.01); G06F 12/0871 (2013.01); G06F 2206/1014 (2013.01); G06F 2212/1016 (2013.01); G06F 2212/466 (2013.01); G06F 2212/7201 (2013.01)

(58) Field of Classification Search
CPC .. G06F 3/0659; G06F 3/0679; G06F 12/0246; G06F 3/061; G06F 3/0688; G06F 11/1068; G06F 3/0656; G06F 3/0613; G06F 3/064; G06F 12/00; G06F 2212/214
See application file for complete search history.

(56) References Cited

U.S. PATENT DOCUMENTS 6,067,608 A * 5/2000 Perry .................... G06F 12/127
                                              345/536
6,993,627 B2   1/2006 Butterworth et al.
(Continued)

FOREIGN PATENT DOCUMENTS

TW       200426674       12/2004
TW       200844840 A     11/2008
(Continued)

*Primary Examiner* — Reginald G Bragdon
*Assistant Examiner* — Thanh D Vo
(74) *Attorney, Agent, or Firm* — McClure, Qualey & Rodack, LLP

(57) ABSTRACT

The present invention provides a data storage device including a flash memory and a random access memory. The flash memory has a data mapping table arranged to record a plurality of mapping relationships between the logical addresses and the physical addresses of a plurality of pages of the flash memory. The data mapping table is divided into a plurality of data mapping sets. The random access memory has a cache area, a sequential-order table, a reverse-order table and a cache-area mapping table. The cache area stores part of the data mapping sets. The cache-area mapping table records the set indexes of the data mapping sets of the cache area. The sequential-order table records the order that the data mapping sets are read from the cache area. The reverse-order table records the opposite order that the data mapping sets are read from the cache area.

19 Claims, 16 Drawing Sheets

(56) References Cited

U.S. PATENT DOCUMENTS

| | | | |
|---|---|---|---|
| 7,017,024 | B2 | 3/2006 | Arimilli et al. |
| 7,020,749 | B2 | 3/2006 | Azuma |
| 7,058,784 | B2 | 6/2006 | Wang |
| 7,986,229 | B2 | 7/2011 | Yeo et al. |
| 2016/0070507 | A1* | 3/2016 | Hoshikawa ......... G06F 12/0246 711/149 |
| 2017/0109042 | A1 | 4/2017 | Ke |
| 2017/0123985 | A1 | 5/2017 | Hooker et al. |
| 2017/0235488 | A1 | 8/2017 | Call et al. |

FOREIGN PATENT DOCUMENTS

| | | |
|---|---|---|
| TW | 201027420 A | 7/2010 |
| TW | 201403451 A | 1/2014 |
| TW | 201523247 A | 6/2015 |
| TW | 201527971 A | 7/2015 |
| TW | 201617876 A | 5/2016 |
| TW | I537729 B | 6/2016 |
| TW | 201631478 A | 9/2016 |

\* cited by examiner

DATA STORAGE DEVICE AND DATA MAINTENANCE METHOD THEREOF

CROSS REFERENCE TO RELATED APPLICATIONS

This application claims priority of Taiwan Patent Application No. 104133817, filed on Oct. 15, 2015, the entirety of which is incorporated by reference herein.

BACKGROUND OF THE INVENTION

Field of the Invention

The present invention is related to a data storage device, and in particular it is related to a data storage device capable of maintaining a cache area using a specific method.

Description of the Related Art

Flash memory is considered a non-volatile data-storage device, using electrical methods to erase and program itself. NAND Flash, for example, is often used in memory cards, USB flash devices, solid state devices, eMMCs, and other memory devices.

Flash memory such as NAND Flash uses a multiple-block structure to store data, wherein the flash memory uses floating gate transistors. The floating gates of the floating gate transistor may catch electronic charges for storing data. Moreover, the mapping relationships of the physical pages of the flash memory and the logical page assigned by the controller are recorded in a mapping table. However, the memory space for the mapping table is huge for the random access memory. Therefore, a data maintenance method that can effectively manage the data in the random access memory is needed.

BRIEF SUMMARY OF THE INVENTION

A detailed description is given in the following embodiments with reference to the accompanying drawings.

An exemplary embodiment provides a data storage device including a flash memory and a random access memory. The flash memory includes a plurality of blocks, each of blocks has a plurality of pages, each of the pages has a logical address and a physical address, the flash memory has a data mapping table arranged to record a plurality of mapping relationships between the logical addresses and the physical addresses, the data mapping table is divided into a plurality of data mapping sets, each of the data mapping sets at least two of the mapping relationship, and each of the data mapping sets corresponds to a set index. The random access memory has a cache area, a sequential-order table, a reverse-order table and a cache-area mapping table, wherein the cache area has a plurality of sectors arranged to store part of the data mapping sets of the data mapping table, the cache-area mapping table has a plurality of sector-mapping columns arranged to record the set indexes of the data mapping sets of the cache area, the sequential-order table is arranged to record the order that the data mapping sets are read from the cache area, and the reverse-order table is arranged to record the opposite order that the data mapping sets are read from the cache area.

Another exemplary embodiment provides a data maintenance method applied to a data storage device of a flash memory, wherein the flash memory includes a plurality of blocks, each of the blocks has a plurality of pages, each of the pages has a logical address and a physical address. The data maintenance method includes: determining a read command or a write command; locating a first data mapping set of a first mapping relationship corresponding to the page indicated by the read command or the write command; determining whether the first data mapping set has been loaded on a cache area according to whether a cache-area mapping table has a first set index corresponding to the first data mapping set, wherein the cache-area mapping table has a plurality of sector-mapping columns corresponding sequentially to a plurality of sectors of the cache area; determining whether any of the sectors of the cache area is available when the cache-area mapping table does not have a first set index; performing a loading process when a first sector of the cache area is available, wherein the loading process includes: reading the first data mapping set from a data mapping table stored in the flash memory to load the first data mapping set on the first sector; and writing the first set index of the first data mapping set into the sector-mapping column of the cache-area mapping table corresponding to the first sector corresponding; and reading the first data mapping set from the cache area to perform the write command or the read command.

Yet another exemplary embodiment provides a data maintenance method applied to a data storage device of a flash memory, wherein the flash memory has a plurality of blocks, each of the blocks has a plurality of pages, each of the pages has a logical address and a physical address. The data maintenance method further includes: loading a part of a plurality of data mapping sets of a data mapping table on a cache area of a random access memory according to at least one read command or at least one write command when the flash memory is powered on, wherein each of the data mapping sets has at least two mapping relationships between the logical addresses and the physical addresses of the same pages, and each of the data mapping sets corresponds to a set index; building a cache-area mapping table to record the set indexes corresponding to the data mapping sets in the cache area; building a reverse-order table to record the opposite order that the data mapping sets are read from the cache area; and building a sequential-order table to record the order that the data mapping sets are read from the cache area.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
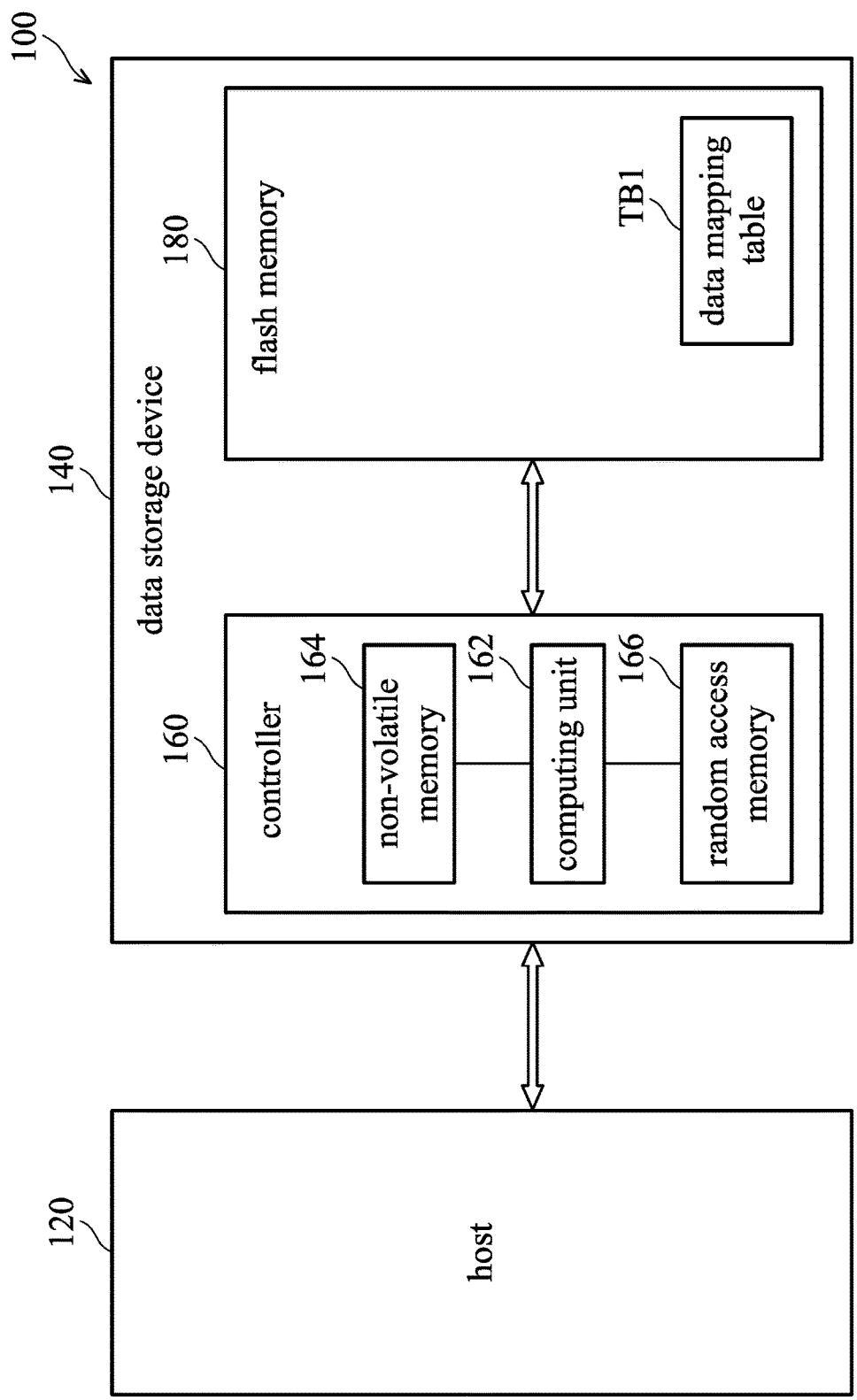
FIG. 1 is a schematic diagram illustrating an electronic system, in accordance with an embodiment.

FIG. 1 is a schematic diagram illustrating an electronic system, in accordance with an embodiment. The electronic system 100 includes a host 120 and a data storage device 140. The data storage device 140 includes a flash memory 180 and a controller 160, and operates in response to the commands of the host 120. The controller 160 includes a computing unit 162, a non-volatile memory 164 (ROM) and a random access memory 166 (RAM). The non-volatile memory 164, the program code stored in the non-volatile memory 164 and data stored in the non-volatile memory 164 constitute firmware executed by the computing unit 162, and the controller 160 is configured to control the flash memory 180 based on the firmware. The flash memory 180 includes a plurality of blocks, each of the blocks has a plurality of pages, each of the pages has a logical address and a physical address, wherein the physical addresses are the permanent addresses of the flash memory 180, the logical addresses are the floating addresses assigned by the host 120 and the controller 160. Moreover, the flash memory 180 further includes a data mapping table TB1 that is dynamically updated by the controller 160, wherein the data mapping table TB1 is arranged to record a plurality of mapping relationships between the logical addresses and the physical addresses of the pages. It should be noted that the minimum erase unit of the flash memory 180 is a block, and the minimum write unit of the flash memory 180 is a page.

Figure 2:
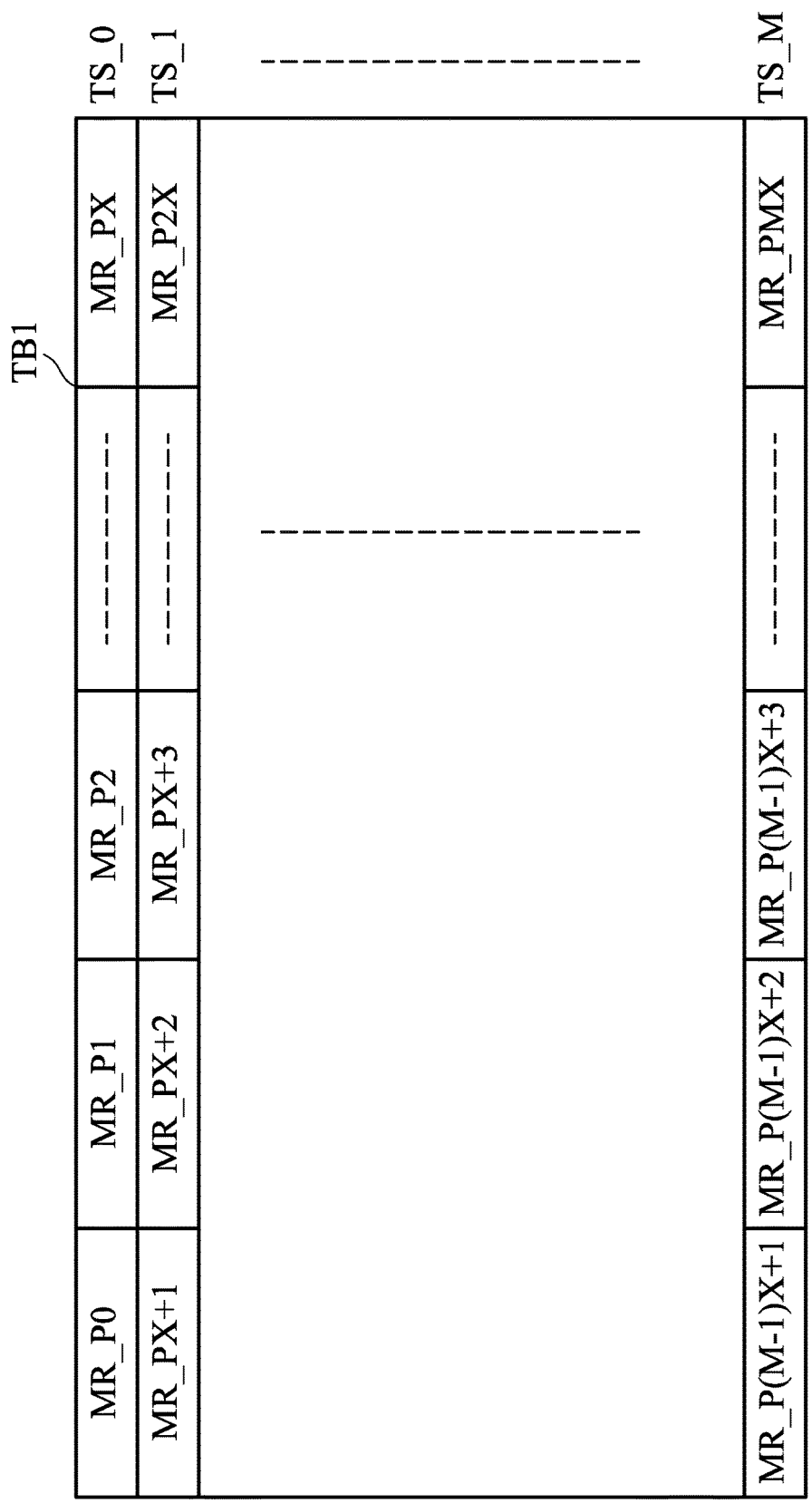
FIG. 2 is a schematic diagram illustrating a data mapping table, in accordance with an embodiment.

FIG. 2 is a schematic diagram illustrating a data mapping table, in accordance with an embodiment. As shown in FIG. 2, the data mapping table TB1 includes the mapping relationships MR_P0~MR_PMX of the logical addresses and the physical addresses of all the pages, wherein each of the mapping relationships MR_P0~MR_PMX corresponds to one page of the flash memory 180, and any two of the mapping relationships MR_P0~MR_PMX are corresponding to the different pages. Moreover, the data mapping table TB1 is divided into a plurality of data mapping sets TS_0~TS_M, each of the data mapping sets TS_0~TS_M has more than one mapping relationship. For example, the data mapping set TS_0 has the mapping relationships MR_P0~MR_PX, the data mapping set TS_1 has the mapping relationships MR_PX+1~MR_P2X, and so on. In this embodiment, each of the data mapping sets TS_0~TS_M has X+1 number of mapping relationships, but it is not limited thereto. In other embodiments, the numbers of mapping relationships of the data mapping sets can be different from each other, and the number of data mapping sets can be adjusted by the designer through the controller 160. It should be noted that each of the data mapping sets TS_0~TS_M corresponds to a set index. In one embodiment, the set index can be 0xAA, 0xBB, 0xCC, 0x128, or other hexadecimal values.

When the data storage device 140 is powered on, the controller 160 can load the data mapping table TB1 on a cache area of the random access memory 166 to perform read operation and update process. However, as the memory space of the flash memory 180 increases, the memory space requirements of the data mapping table TB1 become greater. When the memory space of the whole data mapping table TB1 is greater than the cache area of the random access memory 166, the controller 160 loads a part of the data mapping sets of the data mapping table TB1 on the cache area according to the parameters for operation of the controller. More specifically, when the cache area CA still has space for loading at least one of the data mapping sets TS_0~TS_M, the controller 160 performs a loading process for loading the data mapping set that is required by the operation of the controller on the available sectors of the cache area. When a new data mapping set that hasn't been loaded on the cache area has to be loaded on the cache area from the data mapping table and the cache area is filled, the controller 160 performs a replace process to find the data mapping set that has gone the longest time without having been read from the cache area and replace it with the new data mapping set. When the cache area already has the data mapping set required by the controller 160, the controller 160 performs an update process to update the last read status.

Figure 3:
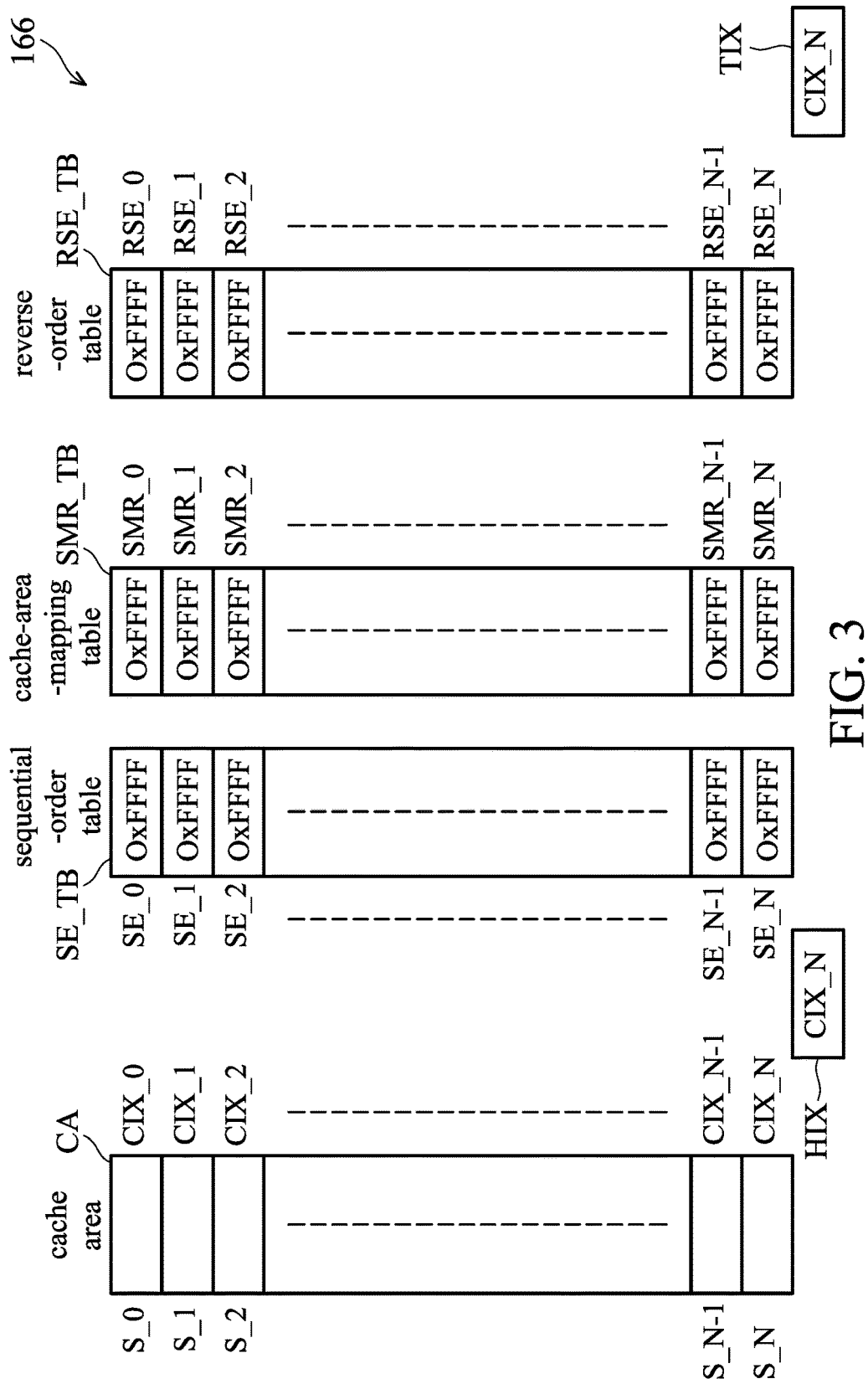
FIG. 3 is a schematic diagram illustrating tables of a random access memory, in accordance with an embodiment.

FIG. 3 is a schematic diagram illustrating tables of a random access memory, in accordance with an embodiment. As shown in FIG. 3, when the data storage device 140 is powered on, the controller 160 builds a cache-area mapping table SMR_TB, a reverse-order table RSE_TB and a sequential-order table SE_TB in the empty space of the random access memory 166 to record the data status of the cache area CA.

The cache area CA has a plurality of sectors S_0~S_N arranged to store a part of the data mapping sets of the data mapping table TB1, wherein each of the sectors is arranged to store one data mapping set. Namely, there are fewer sectors S_0~S_N than there are data mapping sets TS_0~TS_M (N<M).

The cache-area mapping table SMR_TB has a plurality of sector-mapping columns SMR_0~SMR_N arranged to record the set indexes of the data mapping sets TS_0~TS_M in the cache area CA, wherein the sector-mapping columns SMR_0~SMR_N of the cache-area mapping table SMR_TB correspond sequentially to the sectors S_0~S_N of the cache area CA. It should be noted that the initial state of each of the sector-mapping columns SMR_0~SMR_N of the cache-area mapping table SMR_TB has a specific value. In this embodiment, the specific value is 0xFFFF, but it is not limited thereto. Moreover, the set indexes of the data mapping set TS_0~TS_M are different from the specific value.

The sequential-order table SE_TB is arranged to record the order that the data mapping sets TS_0~TS_M are read from the cache area CA, wherein the sequential-order table SE_TB has a plurality of sequential-order columns SE_0~SE_N corresponding sequentially to the sectors S_0~S_N of the cache area CA. Each of the sequential-order columns SE_0~SE_N of the sequential-order table SE_TB is arranged to store the common index of another sequential-order column that is read prior to the sector of the original sequential-order column (for pointing to another sequential-order column that is read prior to the sector of the original sequential-order column). It should be noted that the initial value of each of the sequential-order columns SE_0~SE_N in the sequential-order table SE_TB is a specific value. In this embodiment, the specific value is 0xFFFF, but it is not limited thereto.

The reverse-order table RSE_TB is arranged to record the opposite order that the data mapping sets TS_0~TS_M are read from the cache area CA, wherein the reverse-order table RSE_TB has a plurality of reverse-order columns RSE_0~RSE_N corresponding sequentially to the sectors S_0~S_N of the cache area CA. Each of the reverse-order columns RSE_0~RSE_N of the reverse-order table RSE_TB is arranged to store the common index of another reverse-order column that is read subsequent to the sector of the original reverse-order column (for pointing to another sequential-order column that is read subsequent to the sector of the original sequential-order column). It should be noted that the initial status of each of the reverse-order columns RSE_0~RSE_N of the reverse-order table RSE_TB has a specific value. In this embodiment, the specific value is 0xFFFF, but it is not limited thereto.

It should be noted that, in one embodiment, each of the sectors S_0~S_N corresponds sequentially to a plurality of common indexes CIX_0~CIX_N. The sector-mapping columns SMR_0~SMR_N and the corresponding sectors S_0~S_N have the same common indexes CIX_0~CIX_N, respectively. The sequential-order columns SE_0~SE_N and the corresponding sectors S_0~S_N have the same common indexes CIX_0~CIX_N, respectively. The reverse-order columns RSE_0~RSE_N and the corresponding sectors S_0~S_N have the same common indexes CIX_0~CIX_N, respectively. More specifically, the common indexes of the sector S_0, the sequential-order column SE_0, the sector-mapping column SMR_0 and reverse-order column RSE_0 are CIX_0. The common indexes of the sector S_1, the sequential-order column SE_1, the sector-mapping column SMR_1 and the reverse-order column RSE_1 are CIX_1. The common indexes of the sector S_2, the sequential-order column SE_2, the sector-mapping column SMR_2 and the reverse-order column RSE_2 are CIX_2, and so on. It should be noted that the common indexes CIX_0~CIX_N are not equal to the specific value. In one embodiment, the common indexes CIX_0~CIX_N are all hexadecimals, 0x0, 0x1, 0x2, 0x3 . . . , and so on, but it is not limited thereto.

As described above, the controller 160 builds the cache-area mapping table SMR_TB to record the set indexes corresponding to the data mapping sets TS_0~TS_M in the cache area CA. The controller 160 builds the reverse-order table RSE_TB to record the opposite order that the data mapping sets TS_0~TS_M are read from the cache area CA. The controller 160 builds the sequential-order table SE_TB to record the sequential order that the data mapping sets TS_0~TS_M are read from the cache area CA. In one of the embodiments, the controller 160 further configured to build a head index HIX and a tail index TIX in the random access memory 166, wherein the head index HIX and the tail index TIX can also be built in the other memory device or other circuit. The head index HIX is the common index corresponding to the sector that was read last from the cache area CA for pointing to the last read sector in the cache area CA. The tail index TIX is the common index corresponding to the sector that has gone the longest time without having been read from the cache area CA for pointing to the first read sector in the cache area CA. It should be noted that the sequential-order column, the sector-mapping column and the reverse-order column have the same common index with the corresponding sector, such that the head index HIX and the tail index TIX are also pointing to the sequential-order column, the sector-mapping column, and the reverse-order column corresponding to the common index(es) stored in the head index HIX and the tail index TIX. In this embodiment, the controller 160 selects one of the sectors S_0~S_N according to the tail index TIX. Namely, the controller 160 may select the sector (the data mapping set) that has gone the longest time without having been read from the cache area CA by the tail index TIX, and load the new data mapping set into the selected sector. Moreover, the controller 160 updates the reverse-order table RSE_TB and the sequential-order table SE_TB according to the head index HIX, the original reverse-order table RSE_TB and the original sequential-order table SE_TB. The following paragraphs related to FIGS. 3~8 describe the relationships of the cache area CA, cache-area mapping table SMR_TB, the reverse-order table RSE_TB and the sequential-order table SE_TB.

Figure 4:
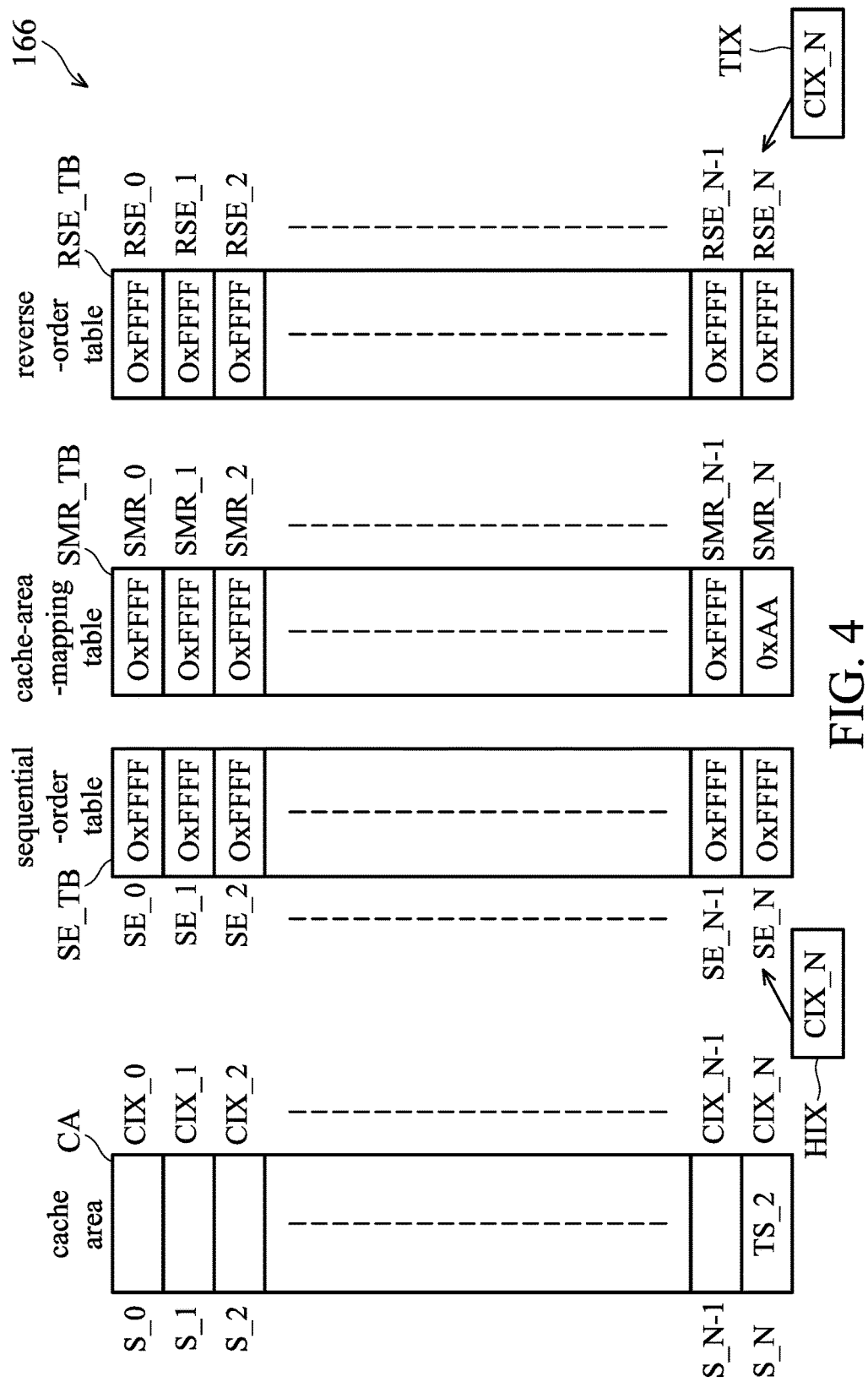
FIG. 4 is a schematic diagram illustrating tables of a random access memory, in accordance with another embodiment.

FIG. 3 shows the initial state of the cache area CA, cache-area mapping table SMR_TB, the reverse-order table RSE_TB and the sequential-order table SE_TB. When the controller 160 receives a read command or a write command in the initial state, the controller 160 obtains a first data mapping set that has a first mapping relationship of the page indicated by the read command or the write command. For example, in one embodiment, the mapping relationship of the logical address and the physical address of the page indicated by the read command/the write command is recorded in the data mapping set TS_2. The controller 160 obtains the page according to the indication of the received read command or the received write command, and finds the corresponding data mapping set TS_2. Next, the controller 160 determines whether the data mapping set TS_2 has been loaded on the cache area CA according to whether the cache-area mapping table SMR_TB has the set index corresponding to the first data mapping set TS_2. For example, the set index of the data mapping set TS_2 is 0xAA. As shown in FIG. 3, none of the data mapping sets is loaded on the cache area CA, so all of the sector-mapping columns SMR_0~SMR_N of the cache-area mapping table SMR_TB are 0xFFFF. Therefore, in this embodiment, the controller 160 determines that the set index 0xAA of the data mapping set TS_2 is not in the cache-area mapping table SMR_TB. Namely, the controller 160 determines that the data mapping set TS_2 is not in the cache area CA according to the cache-area mapping table SMR_TB if it does not have the set index 0xAA of the data mapping set TS_2. Next, the controller 160 determines whether any of the sectors S_0~S_N of the cache area CA is available. As shown in FIG. 3, all of the sectors S_0~S_N of the cache area CA are available, and the controller 160 selects one of the available sectors S_0~S_N. In this embodiment, the controller 160 selects the available sector from the bottom of the cache area CA, so the controller 160 selects the sector S_N. Next, the controller 160 retrieves the data mapping set TS_2 from the data mapping table TB1 of the flash memory 180, and loads the data mapping set TS_2 on the selected sector S_N. Next, the controller 160 updates the cache-area mapping table SMR_TB, the sequential-order table SE_TB, the reverse-order table RSE_TB, the head index HIX and the tail index TIX to record the current state of the cache area CA. As shown in FIG. 4, the controller 160 writes the set index 0xAA of the data mapping set TS_2 into the corresponding sector-mapping column SMR_N, defines the head index HIX and the tail index TIX as the common index CIX_N of the sector S_N. It should be noted that, in this embodiment, the controller 160 keeps the sequential-order column SE_N corresponding to the sector S_N of the sequential-order table SE_TB and the reverse-order column RSE_N corresponding to the sector S_N of the reverse-order table RSE_TB as the specific value 0xFFFF. Lastly, the controller 160 retrieves the data mapping set TS_2 of the cache area CA to perform the received write command or the received read command.

Figure 5:
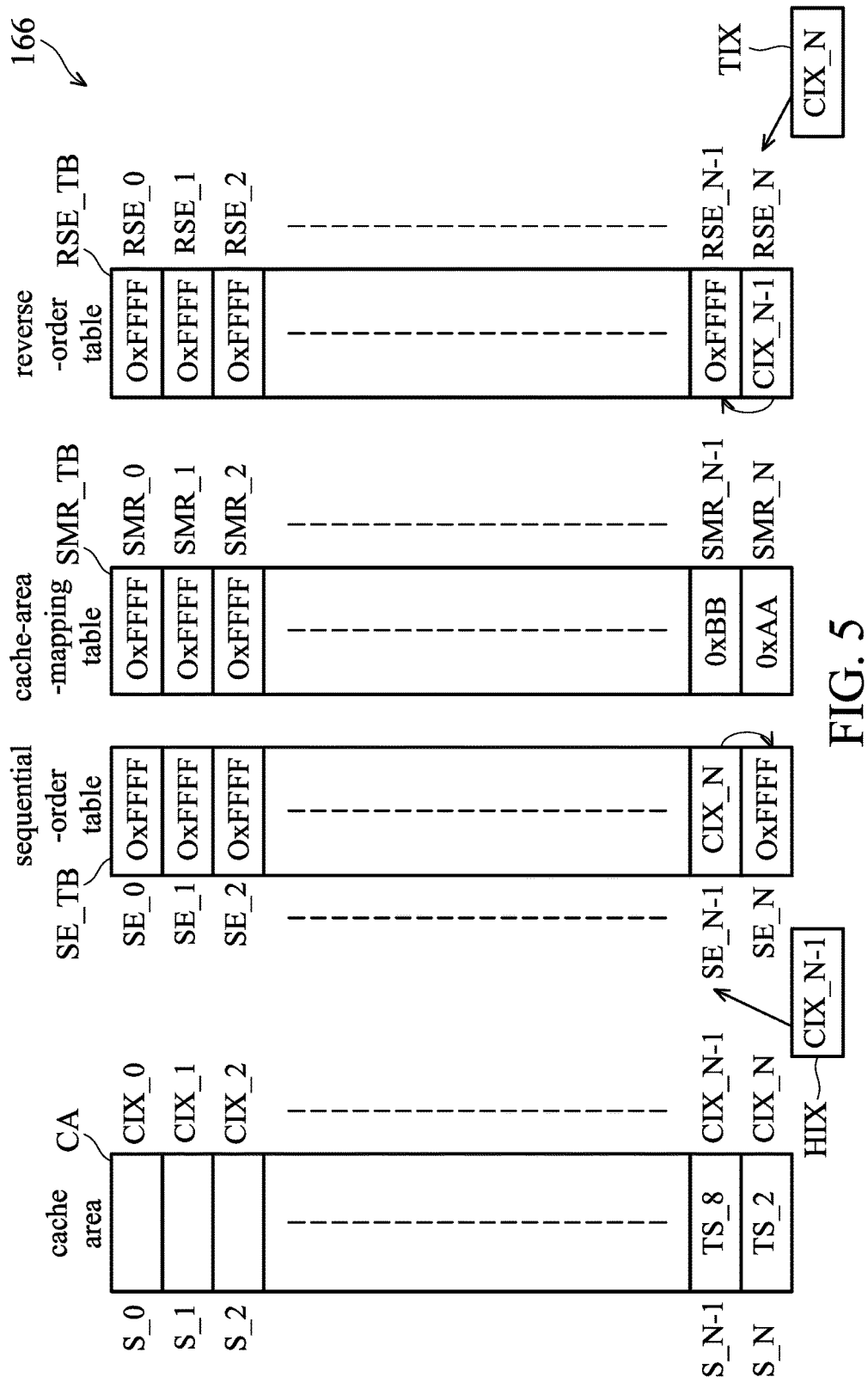
FIG. 5 is a schematic diagram illustrating tables of a random access memory, in accordance with another embodiment.

Next, in the embodiment of FIG. 4, when the controller 160 receives a read command or a write command, the controller 160 obtains a data mapping set that has the mapping relationship of the pages indicated by the received read command or the received write command. For example, in this embodiment the mapping relationship corresponding to the logical address and the physical address of the page indicated by the read command/the write command is recorded in the data mapping set TS_8. Next, the controller 160 determines whether the data mapping set TS_8 has been loaded on the cache area CA according to whether the cache-area mapping table SMR_TB has the set index corresponding to the first data mapping set TS_8. For example, the set index of the data mapping set TS_8 is 0xBB. As shown in FIG. 4, the cache area CA only has the data mapping set TS_2, and all sector-mapping columns of the cache-area mapping table SMR_TB are 0xFFFF except for the sector-mapping column SMR_N is 0xAA. Therefore, in this embodiment, the controller 160 determines that the cache-area mapping table SMR_TB does not have the set index 0xBB of the data mapping set TS_8. Namely, the controller 160 determines that the data mapping set TS_8 is not in the cache area CA when the cache-area mapping table SMR_TB does not have the set index 0xBB of the data mapping set TS_8. Next, the controller 160 determines whether any of the sectors of the cache area CA is available. As shown in FIG. 4, the sectors S_0~S_N-1 of the cache area CA are available. The controller 160 selects an available sector from the cache area CA. In this embodiment, the controller 160 selects the sector S_N-1. Next, the controller 160 retrieves the data mapping set TS_8 form the data mapping table TB1 in the flash memory 180, and loads the data mapping set TS_8 on the selected sector S_N-1. Next, the controller 160 updates the cache-area mapping table SMR_TB, the sequential-order table SE_TB, the reverse-order table RSE_TB, the head index HIX and the tail index TIX to record the current state of the cache area CA. As shown in FIG. 4, the controller 160 locates the sector S_N of the data mapping set TS_2 that was read last from the cache area CA according to the head index HIX, and writes the common index CIX_N of the sequential-order column SE_N corresponding to the sector S_N into the sequential-order column SE_N-1 corresponding to the current sector S_N-1. Next, the controller 160 writes the common index CIX_N-1 of the reverse-order column RSE_N-1 corresponding to the current sector S_N-1 into the reverse-order column RSE_N corresponding to the sector S_N. Next, the controller 160 defines the head index HIX as the common index CIX_N-1 of the current sector S_N-1, and keeps the tail index TIX as the common index CIX_N. The updated cache-area mapping table SMR_TB, the updated sequential-order table SE_TB, the updated reverse-order table RSE_TB, the updated head index HIX and the updated tail index TIX are shown in FIG. 5. Lastly, the controller 160 retrieves the data mapping set TS_8 stored in the cache area CA to perform the received write command and the received read command.

Figure 6:
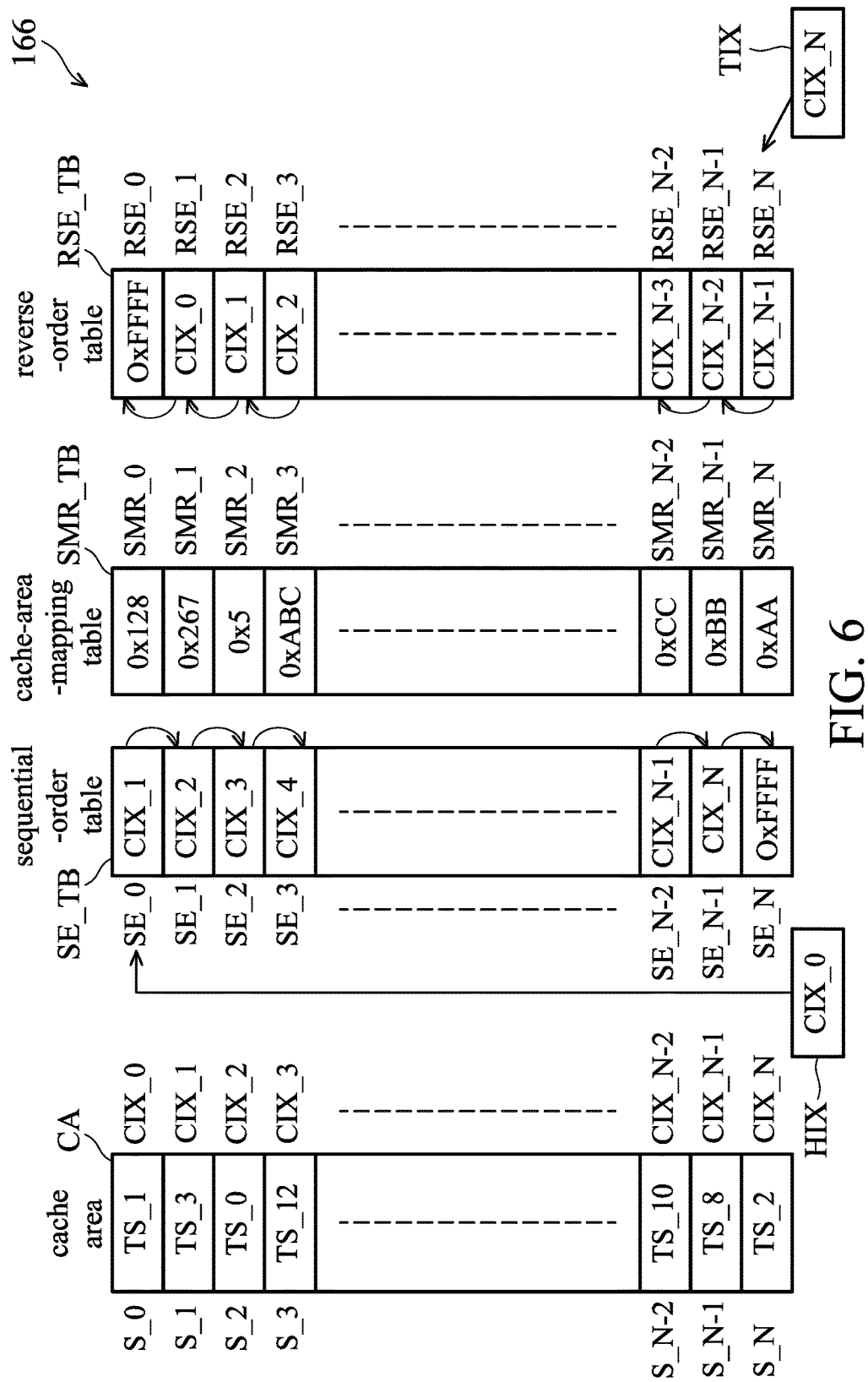
FIG. 6 is a schematic diagram illustrating tables of a random access memory, in accordance with another embodiment.

If the controller 160 continuously receives the write commands and/or the read commands corresponding to the different data mapping sets, the controller 160 repeats the steps described above (the steps for transforming FIG. 4 to FIG. 5) to load the data mapping sets on the sectors S_N-2~S_0, as shown in FIG. 6 (as result in FIG. 6). Namely, the controller 160 repeats the loading process to fill the cache area CA. It should be noted that, in this embodiment, the initial value of the sequential-order table SE_TB and the reverse-order table RSE_TB is the specific value (0xFFFF), so the specific value doesn't have to be written into the reverse-order column corresponding to the sector that was read last from the cache area CA in the loading process and the reverse-order column corresponding to the current sector. In other embodiments, if the specific value of the sequential-order table SE_TB and the reverse-order table RSE_TB is different from the initial value, the controller 160 have to write the specific value into the sequential-order column corresponding to the sector that was read last from the cache area CA and the reverse-order column corresponding to the current sector in the loading process.

Figure 7A:
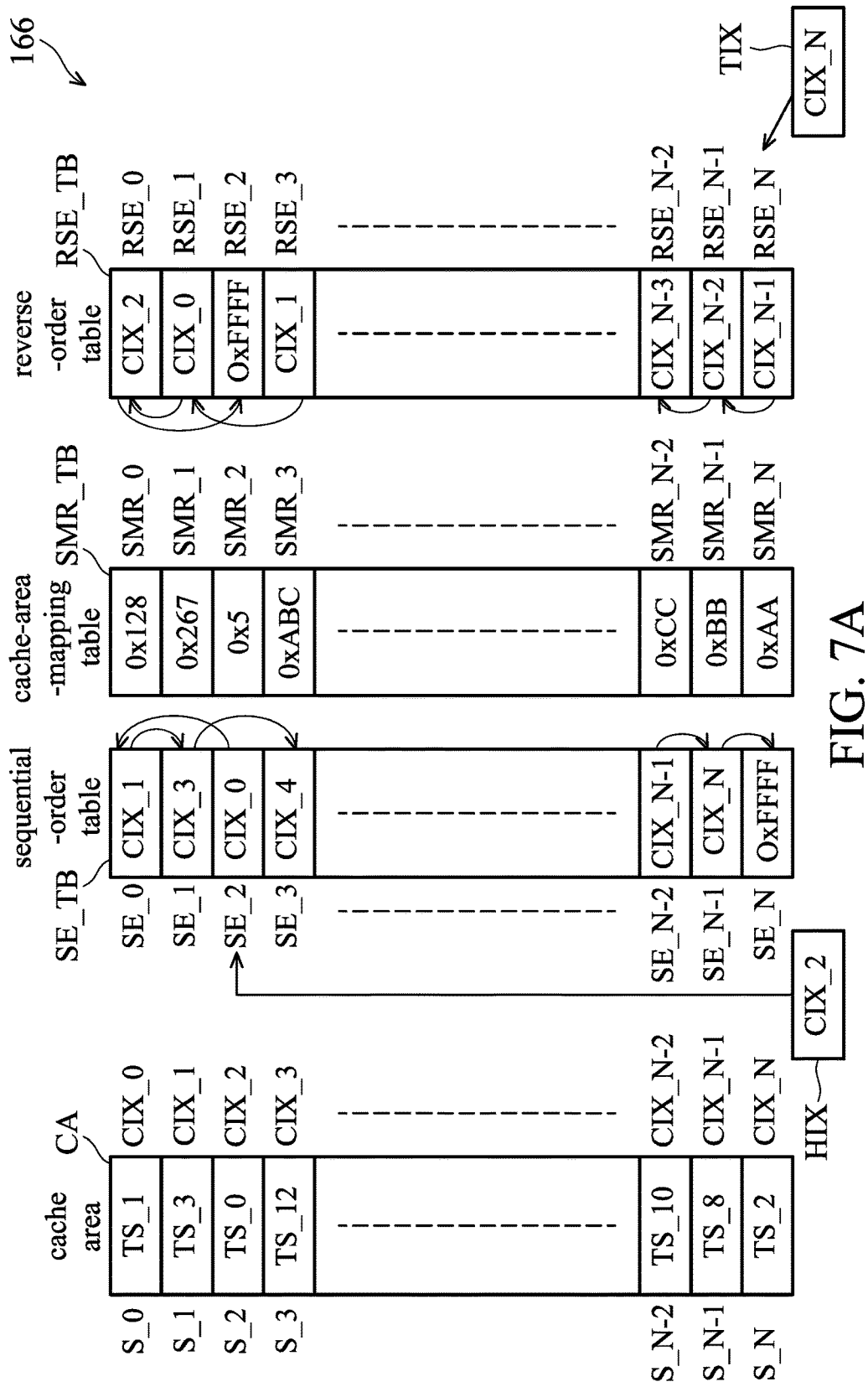
FIG. 7A is a schematic diagram illustrating tables of a random access memory, in accordance with another embodiment.

The following is the description of the update process. In the embodiment of FIG. 6, when the controller 160 receives a read command or a write command, the controller 160 locates the data mapping set that has the mapping relationship of the page indicated by the received read command or the received write command. For example, the data mapping set that has the mapping relationship of the page indicated by the read command or the write command is TS_0. Next, the controller 160 determines whether the data mapping set TS_0 has been loaded on the cache area CA according to whether the cache-area mapping table SMR_TB has the set index 0x5 corresponding to the data mapping set TS_0. In this embodiment, as shown in FIG. 6, the set index 0x5 of the data mapping set TS_0 has been loaded on the sector-mapping columns SMR_2 of the cache-area mapping table SMR_TB. Therefore, in this embodiment, the controller 160 determines that the set index 0x5 of the data mapping set TS_0 is in the cache-area mapping table SMR_TB. Namely, the controller 160 determines that the data mapping set TS_0 has been loaded on the cache area CA when the set index 0x5 of the data mapping set TS_0 is in the cache-area mapping table SMR_TB. Next, the controller 160 updates the cache-area mapping table SMR_TB, the sequential-order table SE_TB, the reverse-order table RSE_TB, the head index HIX and the tail index TIX to record the current state of the cache area CA. As shown in FIG. 6, the controller 160 retrieves the sequential-order column SE_2 of the current sector S_2 to obtain that the sector that is written prior to the current sector S_2 is the sector S_3. Next, the controller 160 writes the common index CIX_1 stored in the reverse-order column RSE_2 corresponding to the current sector S_2 into the reverse-order column RSE_3 corresponding to the sector S_3. Namely, the controller 160 rewrites the reverse-order column RSE_3 to make the reverse-order column RSE_3 re-point to the reverse-order column RSE_1 rather than the original reverse-order column RSE_2. Next, the controller 160 reads the value of the reverse-order column RSE_2 corresponding to the current sector S_2 in the reverse-order table RSE_TB according to the common index CIX_2 of the current sector S_2, and finds that the common index CIX_1 of the sector S_1 is the common index of the sector that is read subsequent to the current sector S_2 according to the common index CIX_1 stored in the reverse-order column RSE_2. Next, the controller 160 writes the common index CIX_3 stored in the sequential-order column SE_2 corresponding to the current sector S_2 into the sequential-order column SE_1 corresponding to the sector S_1. Namely, the controller 160 makes the sequential-order column SE_1 that was pointing to the sequential-order column SE_2 re-point to the sequential-order column SE_3. Next, the controller 160 obtains a sector S_0 of the data mapping set TS_1 than was last read from the cache area CA according to the head index HIX, and writes the common index CIX_0 of the sequential-order column SE_0 corresponding to the sector S_0 into the sequential-order column SE_2 of the current sector S_2. Next, the controller 160 writes the common index CIX_2 of the reverse-order column RSE_2 corresponding to the current sector S_2 into the reverse-order column RSE_0 corresponding to the sector S_0. Lastly, the controller 160 defines the head index HIX as the common index CIX_2 of the current sector S_2, keeps the common index CIX_N in the tail index TIX, and writes a specific value into the reverse-order column RSE_2 corresponding to the current sector S_2. The updated cache-area mapping table SMR_TB, the updated sequential-order table SE_TB, the updated reverse-order table RSE_TB, the updated head index HIX and the updated tail index TIX are shown in FIG. 7A. Next, the controller 160 reads the corresponding sector S_2 in the cache area CA according to the common index CIX_2 of the sector-mapping column SMR_2 arranged to store the set index 0x5 for obtaining the data mapping set TS_0. Namely, the controller 160 reads the data mapping set TS_0 stored in the cache area CA to perform the received write command or the received read command.

Figure 7B:
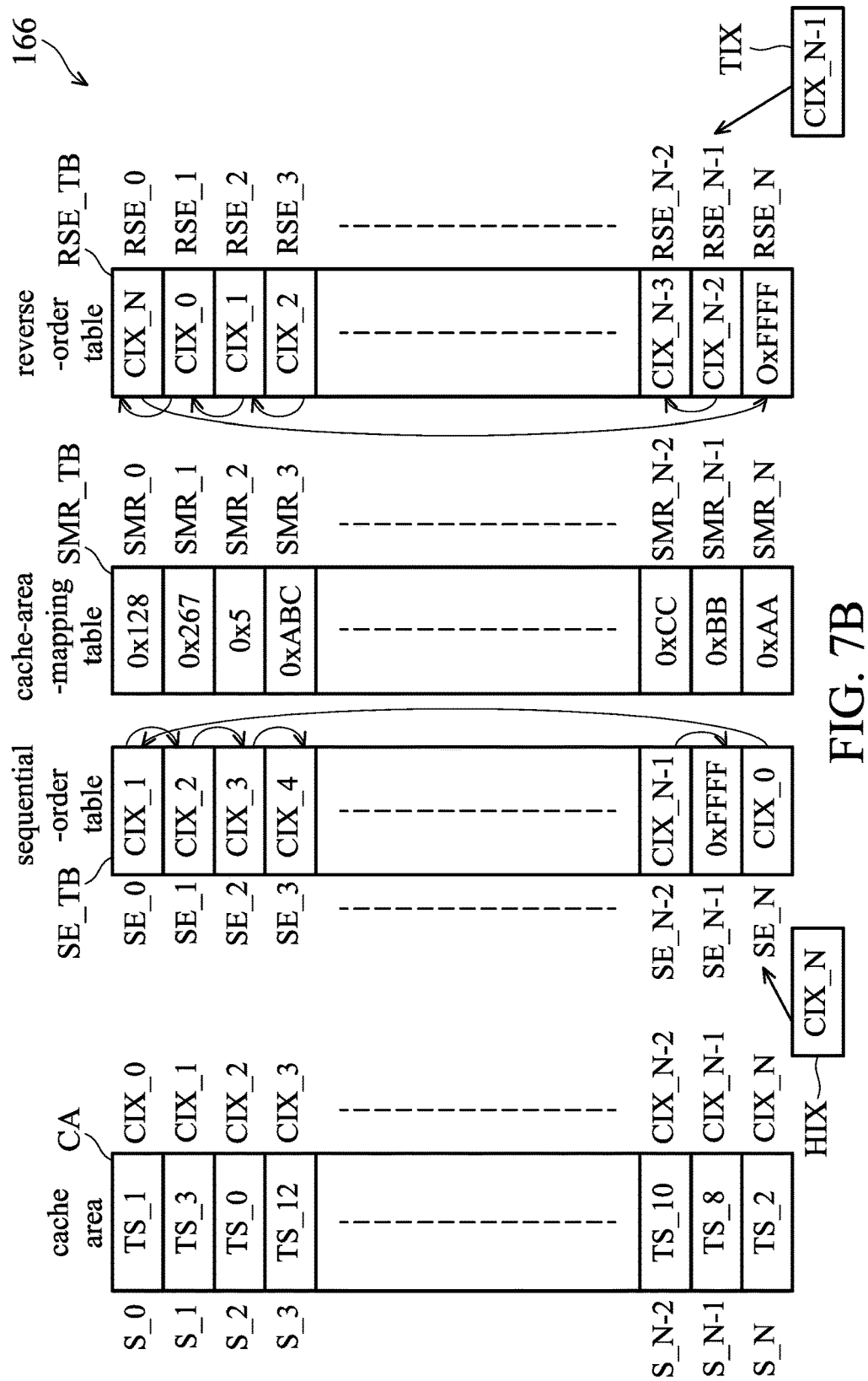
FIG. 7B is a schematic diagram illustrating tables of a random access memory, in accordance with another embodiment.

It should be noted that, in another embodiment of the update process, when the data mapping set corresponding to the write command and the read command has gone the longest time without having been read from the cache area CA, the operations of the controller 160 will be different from the operations corresponding to FIG. 7A. For example, in this embodiment, the data mapping set that includes the mapping relationship of the pages indicated by the read command or the write command is TS_2. The controller 160 determining whether the data mapping set TS_2 is loaded on the cache area CA according to whether the cache-area mapping table SMR_TB includes the set index 0xAA corresponding to the data mapping set TS_2. In this embodiment, as shown in FIG. 6, the set index 0xAA of the data mapping set TS_2 is recorded in the sector-mapping column SMR_N of the cache-area mapping table SMR_TB. Therefore, in this embodiment, the controller 160 determines that the set index 0xAA of the data mapping set TS_2 is included in the cache-area mapping table SMR_TB. Namely, the controller 160 determines that the data mapping set TS_2 has been loaded on the cache area CA when the set index 0xAA of the data mapping set TS_2 is in the cache-area mapping table SMR_TB. It should be noted that, in this embodiment, based on the tail index TIX shown in FIG. 6, the data mapping set TS_2 is the one that has gone the longest time without having been read in the cache area CA. Next, the controller 160 updates the cache-area mapping table SMR_TB, the sequential-order table SE_TB, the reverse-order table RSE_TB, the head index HIX and the tail index TIX to record the current state of the cache area CA. As shown in FIG. 6, the controller 160 retrieves the value stored in the reverse-order column RSE_N of the current sector S_N in the reverse-order table RSE_TB according to the common index CIX_N of the current sector S_N, and obtains the common index CIX_N−1 of the sector S_N−1 that is read subsequent to the current sector S_N according to the common index CIX_N−1 of the reverse-order column RSE_N. Next, the controller 160 writes the value stored in the sequential-order column SE_N corresponding to the current sector S_N into the sequential-order column SE_N−1 corresponding to the sector S_N−1, wherein the current sector S_N has gone the longest time without having been read, and the value stored in the sequential-order column SE_N is the specific value. Next, the controller 160 obtains the sector S_0 including the data mapping set TS_1 that was read last from the cache area CA according to the head index HIX, and writes the common index CIX_0 of the sequential-order column SE_0 corresponding to the sector S_0 into the sequential-order column SE_N corresponding to the sector S_N. Next, the controller 160 writes the common index CIX_N of the reverse-order column RSE_N corresponding to the current sector into the reverse-order column RSE_0 corresponding to the sector S_0. Lastly, the controller 160 defines the head index HIX as the common index CIX_N of the current sector S_N, defines the tail index TIX as the common index CIX_N−1 of the sector S_N−1 that is read subsequent to the current sector S_N, and writes the specific value into the reverse-order column RSE_N corresponding to the common index CIX_N pointed to by the current head index. The updated cache-area mapping table SMR_TB, the updated sequential-order table SE_TB, the updated reverse-order table RSE_TB, the updated head index HIX and the updated tail index TIX are shown in FIG. 7B. Next, the controller 160 reads the sector S_N of the cache area CA to obtain the data mapping set TS_2 according to the common index CIX_N of the sector-mapping column SMR_N that stores the set index 0xAA. Namely, the controller 160 retrieves the data mapping set TS_2 from the cache area CA to perform the received write command and the received read command.

The following is a description of the replace process. Based on the embodiment of FIG. 7A, when the controller 160 receives a read command or a write command, the controller 160 obtains a data mapping set of a mapping relationship of the pages indicated by the read command or the write command. For example, in this embodiment, the data mapping set that includes the mapping relationship of the page indicated by the read command or the write command is TS_77. Next, the controller 160 determines whether the data mapping set TS_77 is loaded on the cache area CA according to whether the cache-area mapping table SMR_TB has the set index 0x333 of the data mapping set TS_77. In this embodiment, the cache area CA does not have data mapping set TS_77, so the set index 0x333 is also not in any sector-mapping columns SMR_0~SMR_N of the cache-area mapping table SMR_TB. The controller 160 determines that the data mapping set TS_77 is not in the cache area CA when the set index 0x333 of the data mapping set TS_77 is not in the cache-area mapping table SMR_TB. Next, the controller 160 determines whether any of the sectors in the cache area CA is available. As shown in FIG. 7A, the sectors S_0~S_N of the cache area CA are all occupied. Next, the controller 160 determines which of the data mapping sets in the cache area CA has gone the longest time without having been read according to the tail index TIX, and writes the data mapping set TS_77 into the data mapping set that has gone the longest time without having been read in the cache area CA. As shown in FIG. 7A, the controller 160 determines that the data mapping set TS_2 has gone the longest time without having been read according to the common index CIX_N stored in the tail index TIX, and obtains that the sector S_N is the one that has gone the longest time without having been read according to the common index CIX_N. Next, the controller 160 retrieves the data mapping set TS_77 from the data mapping table TB1 stored in the flash memory 180 to load the data mapping set TS_77 on the obtained sector S_N for replacing the data mapping set TS_2 that hasn't been read for a long time. Next, the controller 160 updates the cache-area mapping table SMR_TB, the sequential-order table SE_TB, the reverse-order table RSE_TB, the head index HIX and the tail index TIX to record the current state of the cache area CA.

Figure 8:
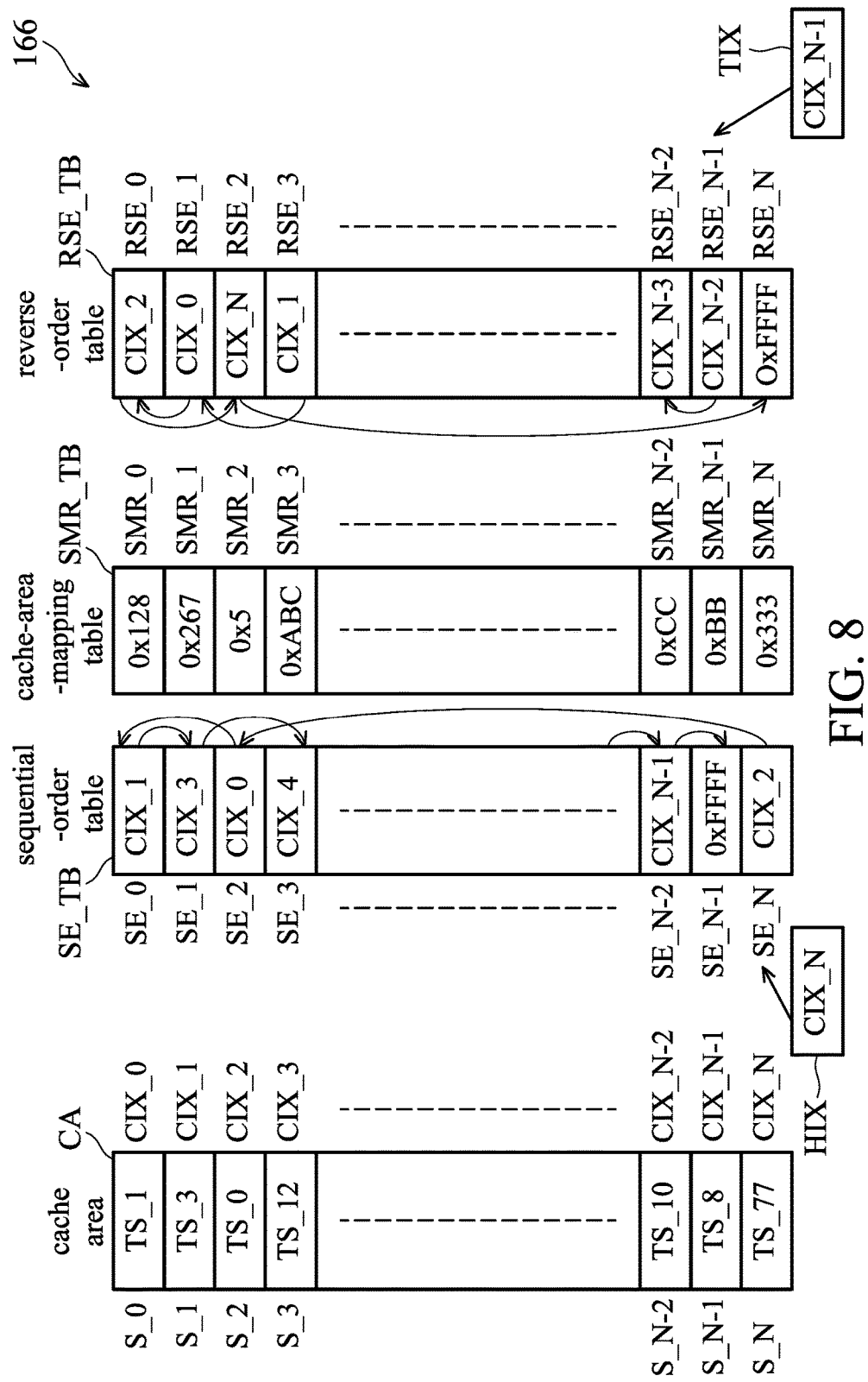
FIG. 8 is a schematic diagram illustrating tables of a random access memory, in accordance with another embodiment.

First, the controller 160 writes the set index 0x333 of the data mapping set TS_77 into the sector-mapping column SMR_N corresponding to the sector S_N. As shown in FIG. 7A, the controller 160 obtains the sector S_2 including the data mapping set TS_0 that was read last from the cache area CA according to the head index HIX, and writes the common index CIX_2 of the sequential-order column SE_2 corresponding to the sector S_2 into the sequential-order column SE_N corresponding to the current sector S_N. Next, the controller 160 writes the common index CIX_N of the reverse-order column RSE_N corresponding to the current sector S_N into the reverse-order column RSE_2 corresponding to the sector S_2. Next, the controller 160 reads the reverse-order column RSE_N of the current sector S_N to obtain the common index CIX_N−1 of the sector S_N−1 that is read subsequent to the current sector S_N. Next, the controller 160 defines the head index HIX as the common index CIX_N of the current sector S_N, and defines the tail index TIX as the common index CIX_N−1 of the sector S_N−1 that is read subsequent to the current sector S_N. Lastly, the controller 160 writes the specific value into the sequential-order column SE_N−1 corresponding to the sector S_N−1 that is read subsequent to the current sector S_N, and writes the specific value into the reverse-order column RSE_N corresponding to the current sector S_N. The updated cache-area mapping table SMR_TB, the updated sequential-order table SE_TB, the updated reverse-order table RSE_TB, the updated head index HIX and the updated tail index TIX are shown in FIG. 8. Lastly, the controller 160 retrieves the data mapping set TS_8 from the cache area CA to perform the received write command and the received read command.

Figure 9:
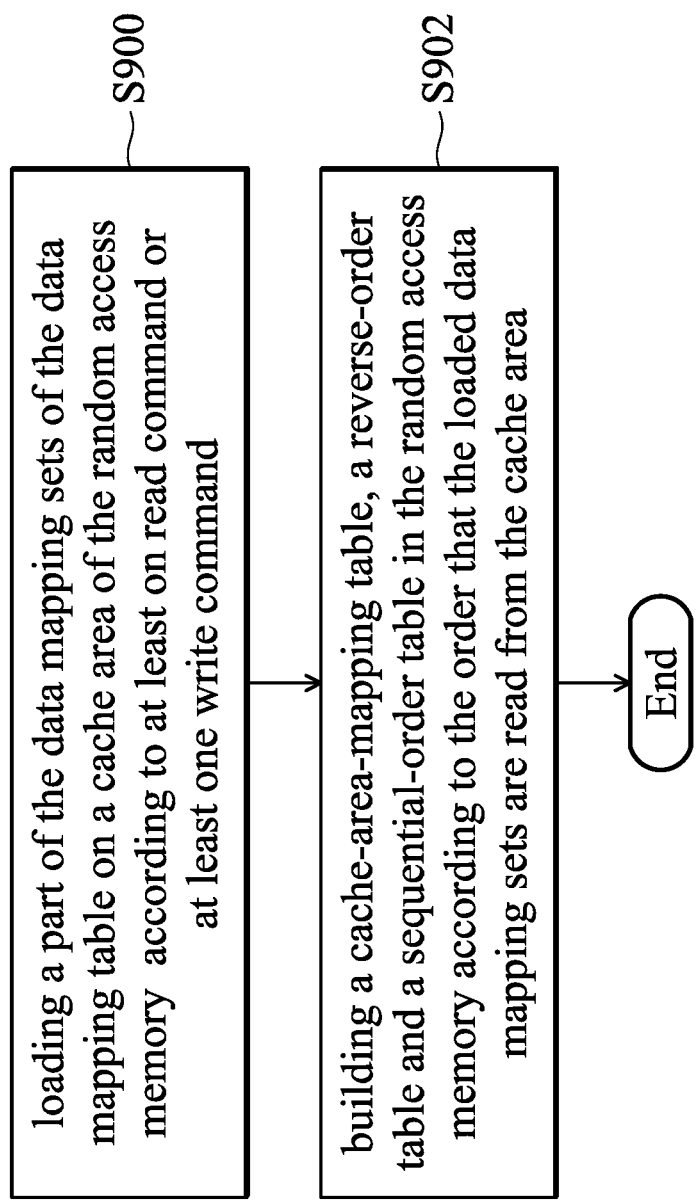
FIG. 9 is a flowchart of a data maintenance method in accordance with some embodiments.
Figure 10A:
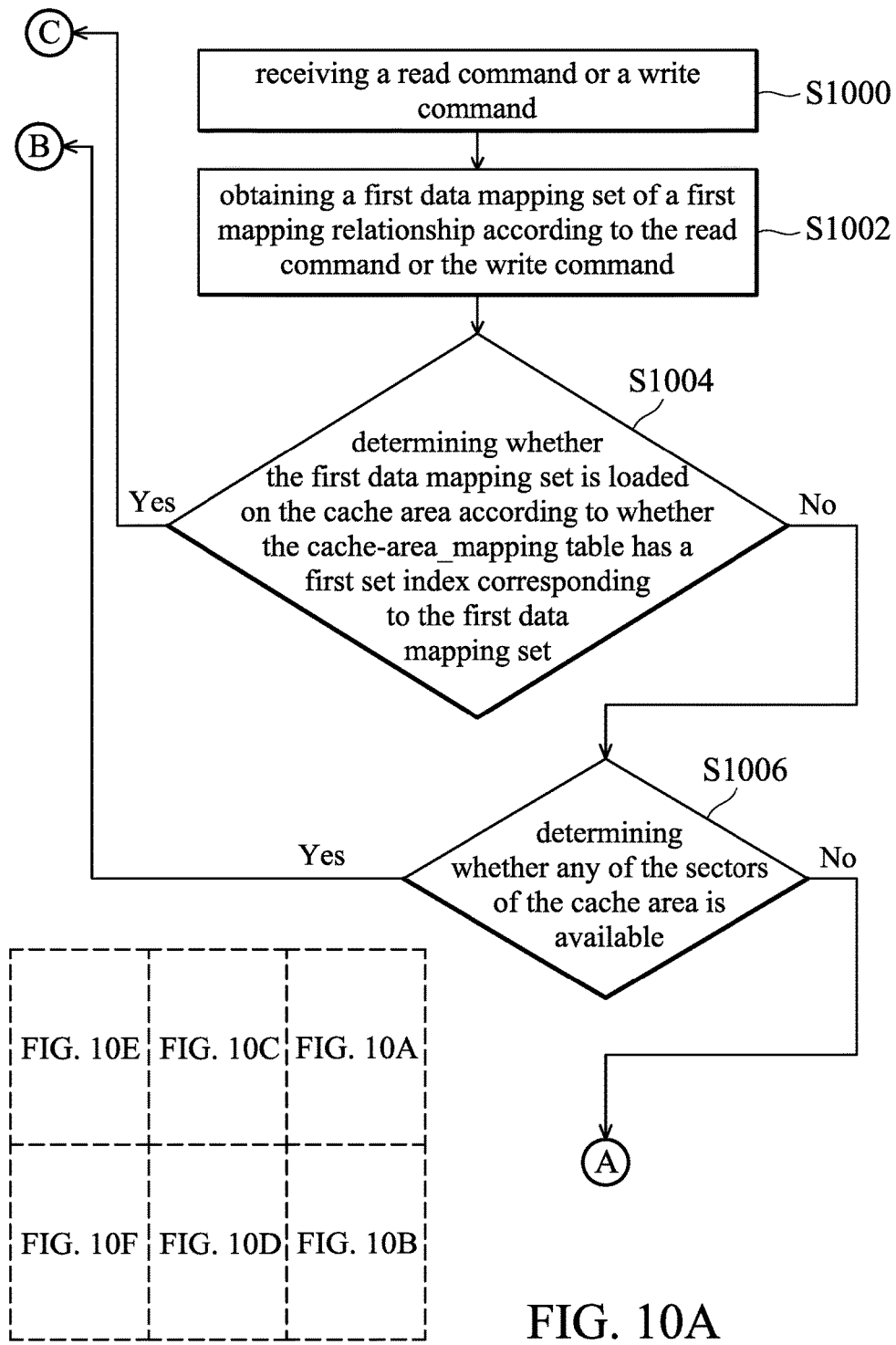
FIGS. 10A~10F is a flowchart of a data maintenance method in accordance with some embodiments.
Figure 10B:
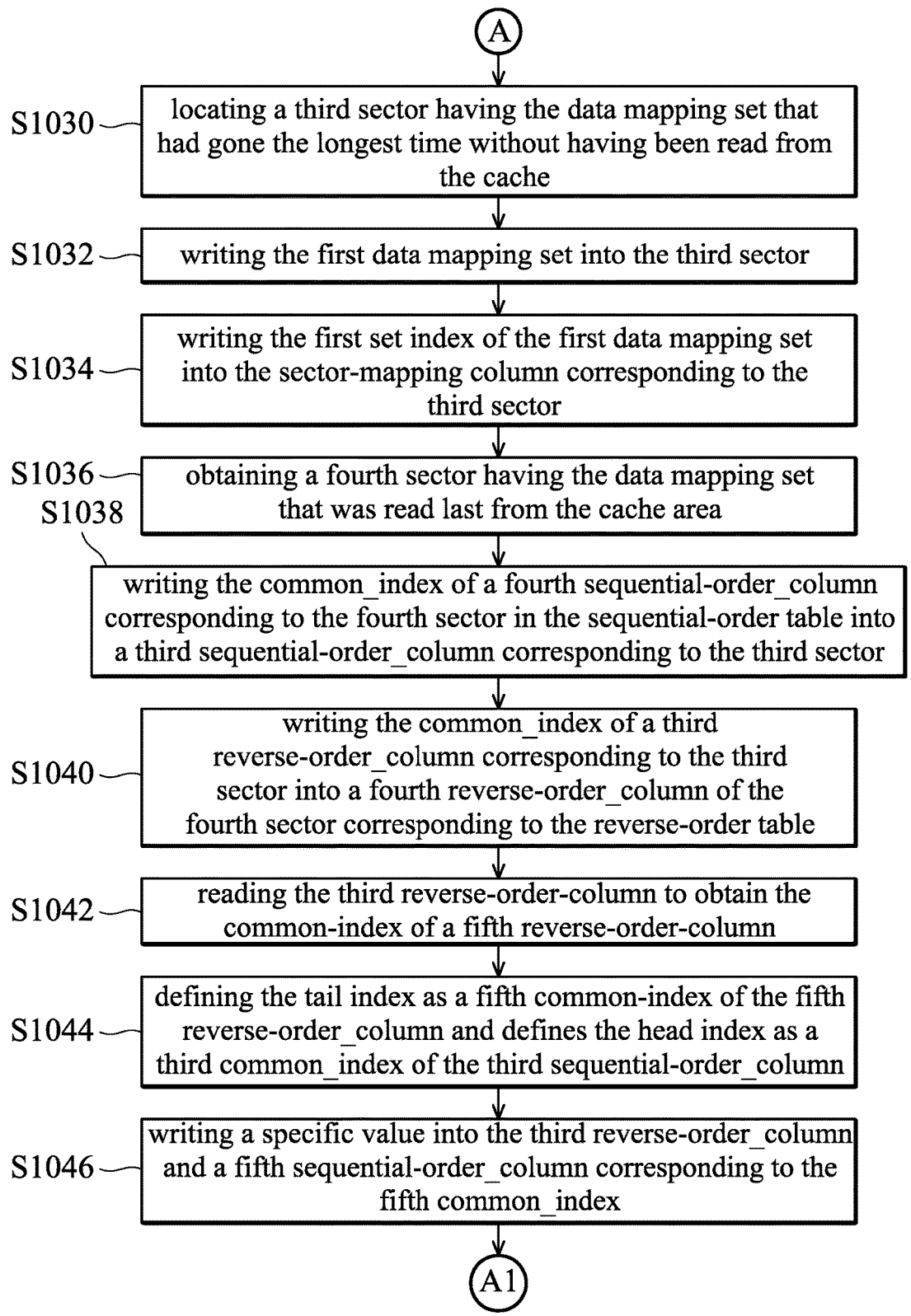
Figure 10C:
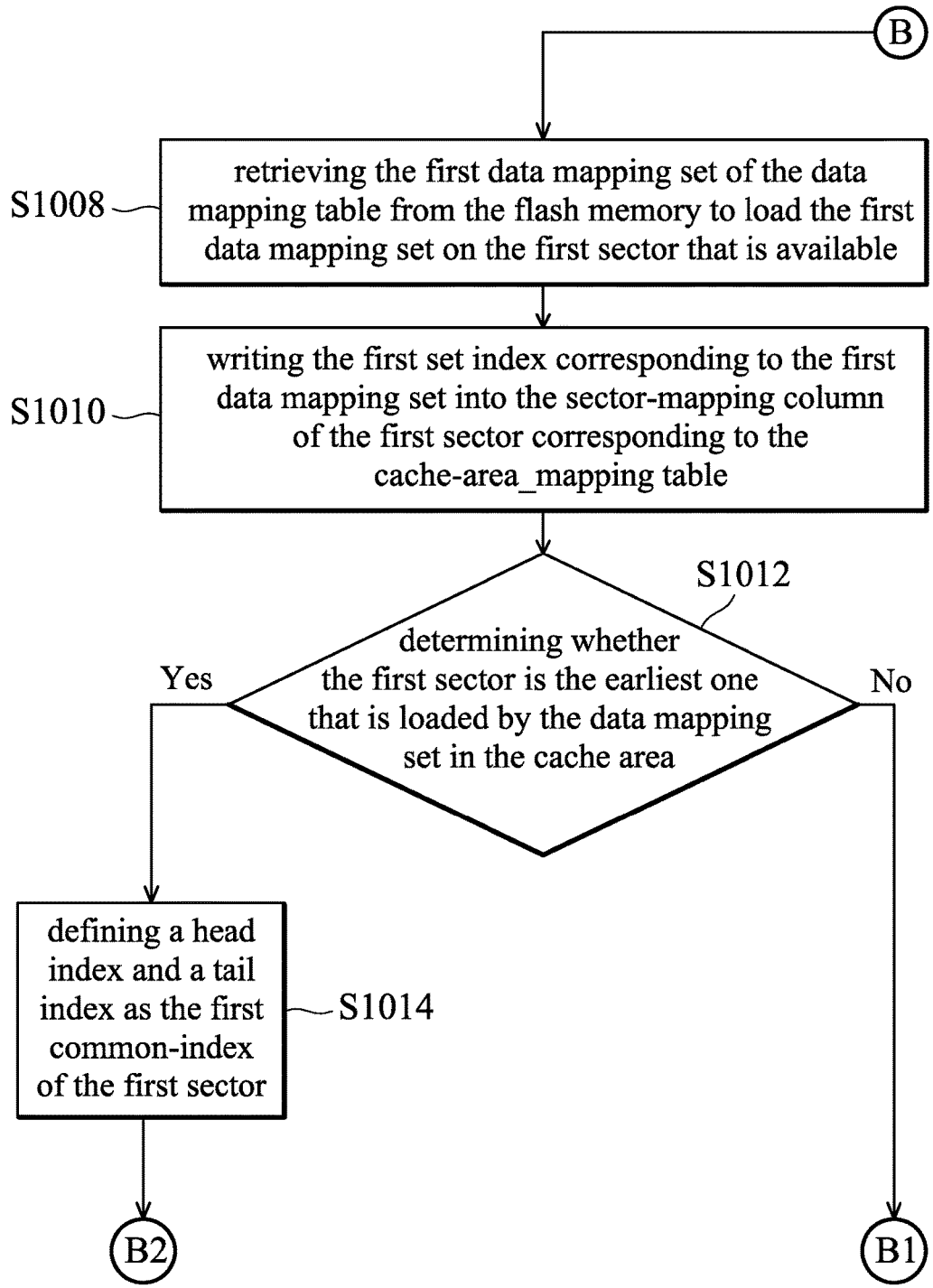
Figure 10D:
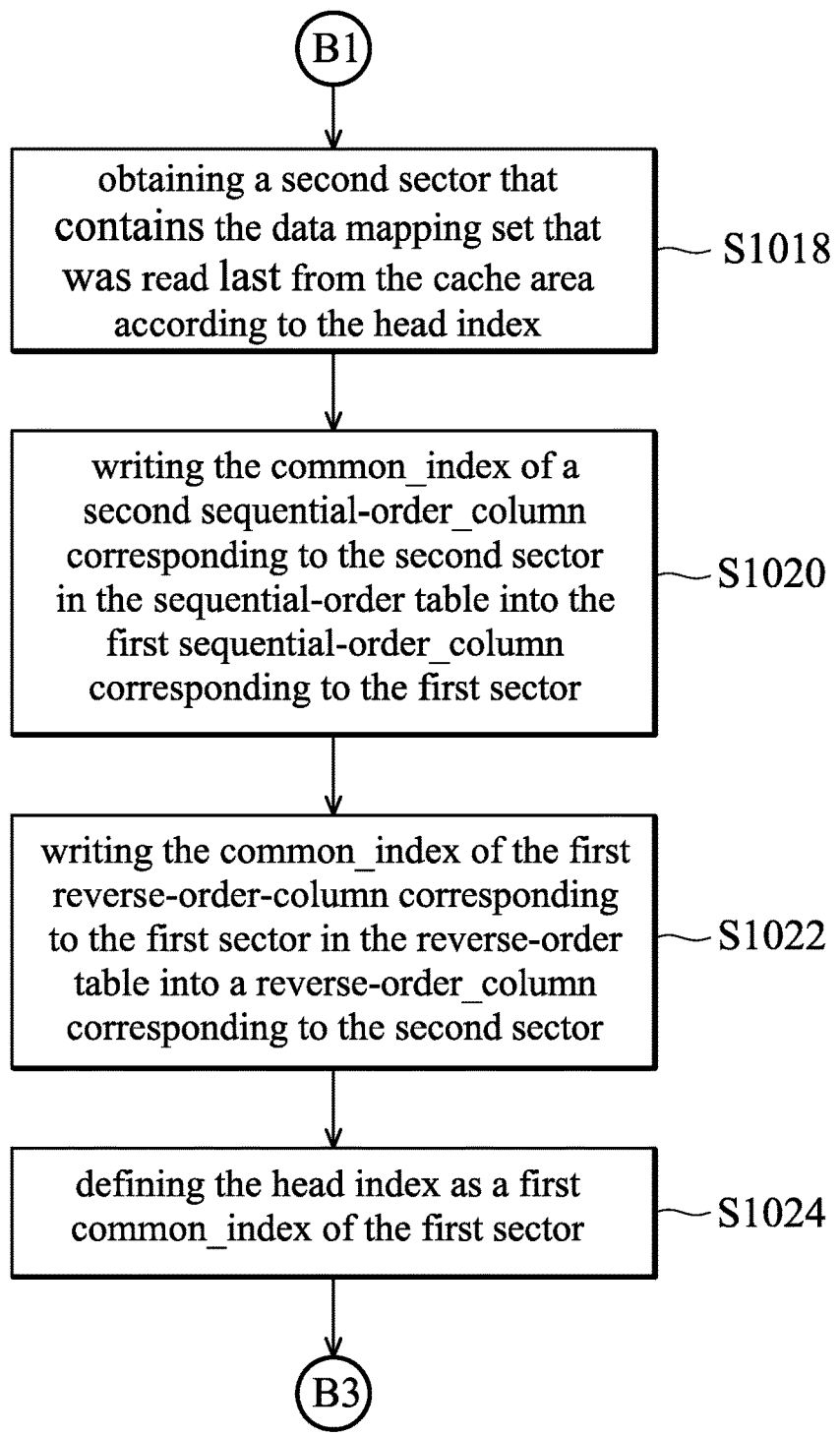
Figure 10E:
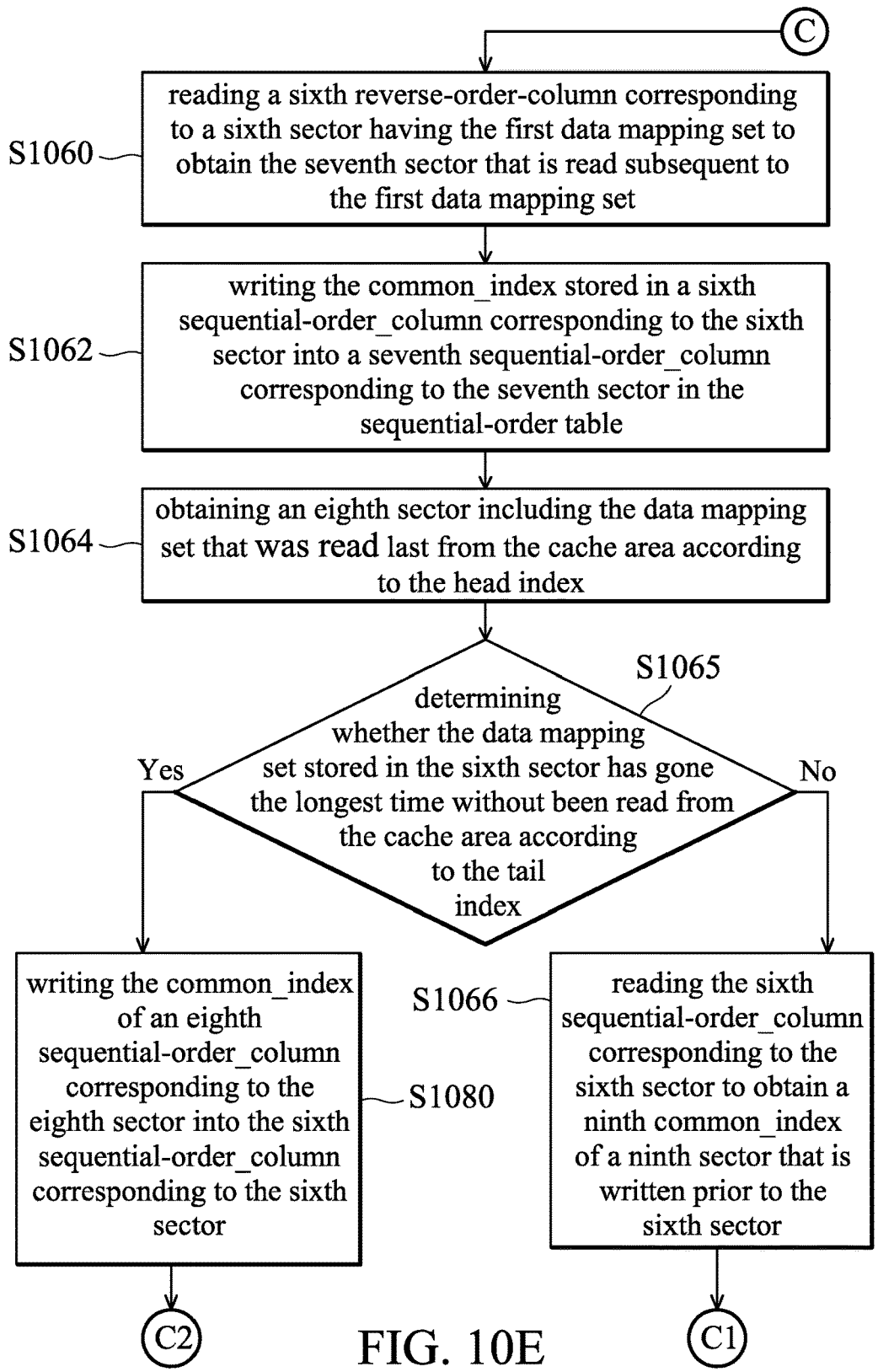
Figure 10F:
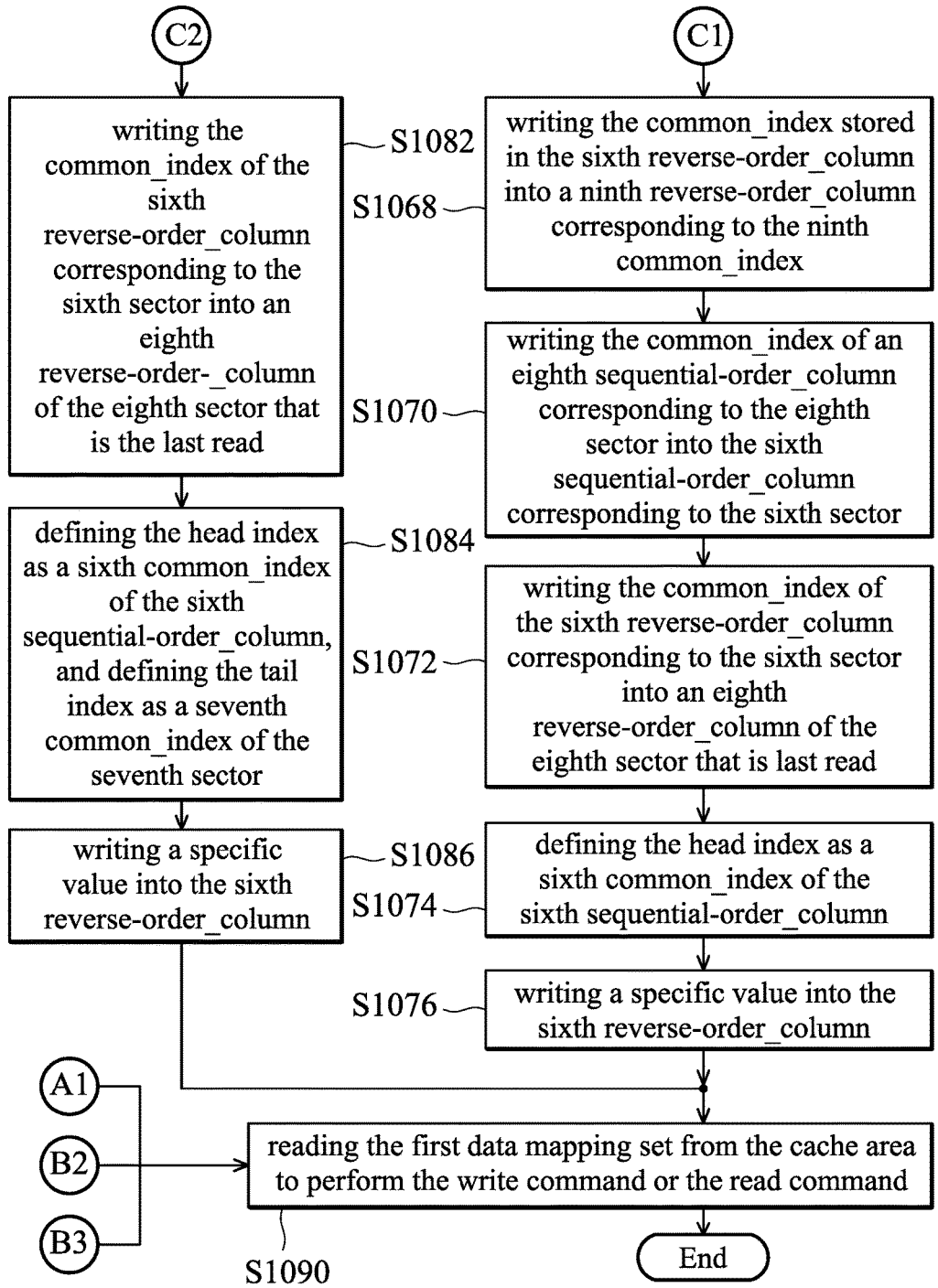

FIG. 9 is a flowchart of a data maintenance method in accordance with some embodiments. The data maintenance method of FIG. 9 is applied to the data storage device 140 of FIG. 1. The process starts at step S900.

In step S900, when the flash memory 180 is powered on, the controller 160 loads a part of the data mapping sets TS_0~TS_N of the data mapping table TB1 on a cache area CA of the random access memory 166 according to at least one read command or at least one write command.

Next, in step S902, the controller 160 builds a cache-area mapping table SMR_TB, a reverse-order table RSE_TB and a sequential-order table SE_TB in the random access memory 166 according to the order that the loaded data mapping sets are read from the cache area CA. More specifically, the controller 160 builds the cache-area mapping table SMR_TB in the random access memory 166 to record the set indexes of the data mapping sets in the cache area CA. The controller 160 builds the reverse-order table RSE_TB in the random access memory 166 to record the opposite order that the data mapping sets are read from the cache area CA. The controller 160 builds the sequential-order table SE_TB in the random access memory 166 to record the sequence order that the data mapping sets are read from the cache area CA. It should be noted that the order that the data mapping sets are read from the cache area CA in step S902 is equal to the order that the data mapping sets of the data mapping table TB1 is read from the cache area CA by the controller 160 for performing the write command and the read command. Moreover, in another embodiment, the controller 160 builds a head index HIX and a tail index TIX according to the order that the data mapping sets of the data mapping table TB1 is read from the cache area CA. When the new data mapping set that hasn't been loaded on the cache area CA has to be loaded on the cache area CA from the data mapping table TB1 and the cache area CA is filled, the controller 160 selects one of the sectors S_0~S_N from the cache area CA for loading the new data mapping set into the selected sector according to the tail index TIX. After the new data mapping set is loaded on the selected sector, the controller 160 updates the reverse-order table and the sequential-order table according to the head index, the content of the reverse-order table and the content of the sequential-order table SE_TB.

FIGS. 10A~10F is a flowchart of a data maintenance method in accordance with some embodiments. The data maintenance method of FIG. 10 is applied to the data storage device 140 of FIG. 1. The process starts at step S1000.

In step S1000, the controller 160 receives a read command or a write command. The read command/the write command is arranged to read/write a specific page of the flash memory 180. The read command/the write command can be received from the host 120 or produced by the controller 160 for data maintenance.

Next, in step S1002, the controller 160 obtains a first data mapping set of a first mapping relationship according to the read command or the write command received in step S1000. For example, the mapping relationship of the logical address and the physical address of the page indicated by the read command or the write command is stored in the data mapping set TS_2, and the controller 160 obtains the corresponding data mapping set TS_2 of the specific page according to the received read command or the received write command.

Next, in step S1004, the controller 160 determines whether the first data mapping set is loaded on the cache area CA according to whether the cache-area mapping table SMR_TB has a first set index corresponding to the first data mapping set. When the first data mapping set is not loaded on the cache area CA, the process goes to step S1006, otherwise, the process goes to step S1060 to perform an update process.

In step S1006, the controller 160 determines whether any of the sectors of the cache area CA is available. It should be noted that, in this embodiment, the available sector is the sector that isn't written by the data mapping set in the cache area CA. When the cache area CA has at least one available sector, the process goes to step S1008 to perform a loading process, otherwise, the process goes to step S1030 to perform a replace process.

In step S1008, the controller 160 retrieves the first data mapping set of the data mapping table TB1 from the flash memory 180 to load the first data mapping set on the first sector that is available. For example, as shown in FIG. 3, all of the sectors S_0~S_N of the cache area CA are available, the controller 160 selects an available sector. In one embodiment, the controller 160 selects an available sector from the bottom of the cache area CA, so the controller 160 selects the sector S_N. Next, the controller 160 retrieves the data mapping set TS_2 from the data mapping table TB1 of the flash memory 180, and loads the data mapping set TS_2 on the selected sector S_N. In another embodiment, as shown in FIG. 4, the sectors S_0~S_N−1 of the cache area CA are available, and the controller 160 selects the available sector from the bottom of the cache area CA. Therefore, the controller 160 selects the sector S_N−1, but it is not limited thereto. Next, the controller 160 retrieves the data mapping set TS_8 from the data mapping table TB1 of the flash memory 180 to load the data mapping set TS_8 on the selected sector S_N−1.

Next, in step S1010, the controller 160 writes the first set index corresponding to the first data mapping set into the sector-mapping column of the first sector corresponding to the cache-area mapping table SMR_TB. For example, in the embodiment of FIG. 4, the controller 160 writes the data mapping set TS_2 corresponding to the set index 0xAA into the selected sector S_N. Therefore, the controller 160 writes the set index 0xAA of the data mapping set TS_2 into the sector-mapping column SMR_N corresponding to the sector S_N in step S1010. In the embodiment of FIG. 5, the controller 160 writes the data mapping set TS_8 corresponding to the set index 0xBB into the sector S_N-1. Therefore, the controller 160 writes the set index 0xBB of the data mapping set TS_8 into the sector-mapping column SMR_N-1 corresponding to the sector S_N-1 in step S1010.

Next, in step S1012, the controller 160 determines whether the first sector is the earliest one that is loaded by the data mapping set in the cache area CA. Namely, the controller 160 determines whether the other sectors, except for the first sector of the cache area CA, are empty. When the first sector is the earliest one that is loaded by the data mapping set in the cache area CA, the process goes to step S1014, otherwise, the process goes to step S101. It should be noted that the controller 160 can further determine whether the first sector is the earliest one loaded by the data mapping set in the cache area CA in step S1006.

In step S1014, the controller 160 defines a head index HIX and a tail index TIX as the first common index of the first sector. For example, in the embodiment of FIG. 4, the data mapping set TS_2 is the first one written in the cache area CA, wherein the data mapping set TS_2 is loaded in the sector S_N. Therefore, in step S1014, the controller 160 defines both the head index HIX and the tail index TIX as the common index CIX_N of the sector S_N. Next, the process goes to step S1090.

In step S1018, the controller 160 obtains a second sector that contains the data mapping set that was read last from the cache area CA according to the head index HIX. It should be noted that, in this embodiment, the data mapping set that was read last from the cache area CA is equal to the data mapping set corresponding to the last received read command or write command.

Next, in step S1020, the controller 160 writes the common index of a second sequential-order column corresponding to the second sector in the sequential-order table SE_TB into the first sequential-order column corresponding to the first sector. For example, in the embodiment of FIG. 5, the data mapping set TS_8 is not the first one that was written into the cache area CA, wherein the data mapping set TS_8 is written into the sector S_N-1 (the first sector). Before updating the random access memory 166, the controller 160 obtains a sector S_N (the second sector) including the data mapping set TS_2 that was read last from the cache area CA according to the current head index HIX (as shown in FIG. 4) in step S1018. Next, in step S1020, the controller 160 writes the common index CIX_N of the sequential-order column SE_N (the second sequential-order column) corresponding to the sector S_N (the second sector) into the sequential-order column SE_N-1 (the first sequential-order column) corresponding to the current sector S_N-1 (the first sector).

Next, in step S1022, the controller 160 writes the common index of the first reverse-order column corresponding to the first sector in the reverse-order table RSE_TB into a reverse-order column corresponding to the second sector. For example, based on the embodiment of FIG. 5, the controller 160 writes the common index CIX_N-1 of the reverse-order column RSE_N-1 (the first reverse-order column) corresponding to the current sector S_N-1 (the first sector) into the reverse-order column RSE_N corresponding to the sector S_N (the second sector) in step S1022.

Next, in step S1024, the controller 160 defines the head index HIX as a first common index of the first sector. For example, based on the embodiment of FIG. 5, the controller 160 defines the head index HIX as the common index CIX_N-1 (the first common index) of the current sector S_N-1 (the first sector), and keeps the common index CIX_N (the second common index) as the tail index TIX in step S1024. Next, the process goes to step S1090.

In step S1030, the controller 160 locates a third sector having the data mapping set that had gone the longest time without having been read from the cache area CA according to the tail index TIX. It should be noted that, in this embodiment, the data mapping set that went the longest time without being read from the cache area CA is the data mapping set read by the controller 160 in response to the last read command/write command in the current cache area CA.

Next, in step S1032, the controller 160 writes the first data mapping set into the third sector. For example, in the embodiment of FIG. 8, the mapping relationship of the pages indicated by the read command/the write command is included in the data mapping set TS_77 (the first data mapping set). The controller 160 determines that the set index 0x333 of the data mapping set TS_77 is not in the cache-area mapping table SMR_TB in the step S1004, and the controller 160 determines that none of the sectors of the cache area CA is available in step S1006. Therefore, in step S1030, the controller 160 determines that the data mapping set TS_2 has gone the longest time without having been read from the cache area CA according to the tail index TIX in the table of FIG. 7A before updating, and the sector corresponding to the data mapping set TS_2 is the sector S_N (the third sector). Therefore, in step S1032, the controller 160 retrieves the data mapping set TS_77 (the first data mapping set) from the data mapping table TB1 stored in the flash memory 180 to load the data mapping set TS_77 into the obtained sector S_N (the third sector) for replacing the data mapping set TS_2 that hasn't been read for a long time.

Next, in step S1034, the controller 160 writes the first set index of the first data mapping set into the sector-mapping column corresponding to the third sector in the cache-area mapping table SMR_TB. Based on the embodiment of FIG. 8, the controller 160 writes the set index 0x333 (first set index) corresponding to the data mapping set TS_77 (the first data mapping set) into the sector-mapping column SMR_N corresponding to the sector S_N (the third sector) in the cache-area mapping table SMR_TB in step S1034.

Next, in step S1036, the controller 160 obtains a fourth sector having the data mapping set that was read last from the cache area CA according to the head index HIX.

Next, in step S1038, the controller 160 writes the common index of a fourth sequential-order column corresponding to the fourth sector in the sequential-order table SE_TB into a third sequential-order column corresponding to the third sector in the sequential-order table SE_TB. For example, in the embodiment of FIG. 8, the controller 160 obtains the sector S_2 (the fourth sector) having the data mapping set TS_0 that was read last from the cache area CA according to the head index HIX before updating the tables of FIG. 7A in step S1036. Next, in step S1038, the controller 160 writes the common index CIX_2 of the sequential-order column SE_2 (the fourth sequential-order column) corresponding to the sector S_2 (the fourth sector) into the sequential-order column SE_N (the third sequential-order column) corresponding to the current sector S_N (the third sector).

Next, in step S1040, the controller 160 writes the common index of a third reverse-order column corresponding to the third sector in the reverse-order table RSE_TB into a fourth reverse-order column of the fourth sector corresponding to the reverse-order table RSE_TB. For example, based on the embodiment of FIG. 8, the controller 160 writes the common index CIX_N of the reverse-order column RSE_N (the third reverse-order column) corresponding to the current sector S_N (the third sector) into the reverse-order column RSE_2 (the fourth reverse-order column) corresponding to the sector S_2 (the fourth sector).

Next, in step S1042, the controller 160 reads the third reverse-order column to obtain the common index of a fifth reverse-order column of the reverse-order columns RSE_0~RSE_N. Namely, the controller 160 reads the third reverse-order column corresponding to the current sector (the third sector) to obtain a fifth sector that is read subsequent to the current sector (the third sector).

Next, in step S1044, the controller 160 defines the tail index TIX as a fifth common index of the fifth reverse-order column and defines the head index HIX as a third common index of the third sequential-order column. For example, based on the embodiment of FIG. 8, the controller 160 reads the reverse-order column RSE_N (the third reverse-order column) corresponding to the current sector S_N (the third sector) to obtain the common index CIX_N−1 (the common index of the fifth reverse-order column) of the sector S_N−1 that is read subsequent to the current sector S_N (the third sector) in step S1044. Next, the controller 160 defines the head index HIX as the common index CIX_N of the current sector S_N (the third sector), and defines the tail index TIX as the common index CIX_N−1 (the fifth common index) of the sector S_N−1 (the fifth sector) that is read subsequent to the current sector S_N.

Next, in step S1046, the controller 160 writes a specific value into the third reverse-order column and a fifth sequential-order column corresponding to the fifth common index. Namely, the controller 160 writes the specific value into the reverse-order column corresponding to the common index pointed the current head index, and writes the specific value into the sequential-order column corresponding to the common index pointed to by the tail index. As shown in FIG. 8, the controller 160 writes the specific value into the reverse-order column RSE_N corresponding to the current sector S_N (the third sector) and the sequential-order column SE_N−1 (the fifth sequential-order column) corresponding to the common index CIX_N−1 (the common index of the fifth reverse-order column). Next, the process goes to step S1090.

In step S1060, the controller 160 reads a sixth reverse-order column corresponding to a sixth sector having the first data mapping set to obtain the seventh sector that is read subsequent to the first data mapping set. Namely, the controller 160 reads a sixth reverse-order column corresponding to a sixth sector in a reverse-order table RSE_TB to obtain a seventh sector that is read subsequent to the sixth sector. For example, in the embodiment of FIG. 7A, a mapping relationship of the pages indicated by the read command or the write command is included in the data mapping set TS_0. As shown in FIG. 6 before updating the tables, the set index 0x5 of the data mapping set TS_0 is in the sector-mapping column SMR_2 of the cache-area mapping table SMR_TB. Therefore, the controller 160 determines that the data mapping set TS_0 is loaded on the cache area CA when the set index 0x5 of the data mapping set TS_0 is in the cache-area mapping table SMR_TB in step S1004. Next, in step S1060, the controller 160 reads the reverse-order column RSE_2 (the sixth reverse-order column) corresponding to the sector S_2 (sixth sector) in the reverse-order table RSE_TB according to the common index CIX_2 of the current sector S_2 (the sixth sector), and finds out that the sector S_1 is read subsequent to the current sector S_2 (the sixth sector) according to the common index CIX_1 stored in the reverse-order column RSE_2 (the sixth reverse-order column). In the embodiment of FIG. 7B, a mapping relationship of the pages indicated by the read command or the write command is included in the data mapping set TS_2. As shown in FIG. 6 before updating the table, the set index 0xAA of the data mapping set TS_2 is in the sector-mapping column SMR_N of the cache-area mapping table SMR_TB. Therefore, the controller 160 determines that the data mapping set TS_2 is in the cache area CA when the set index 0xAA corresponding to the data mapping set TS_N is in the cache-area mapping table SMR_TB in step S1004. Next, in step S1060, the controller 160 reads the reverse-order column RSE_N (the sixth reverse-order column) corresponding to the current sector S_N (the sixth sector) in the reverse-order table RSE_TB according to the common index CIX_N of the current sector S_N (sixth sector), and finds out that the sector S_N−1 is read subsequent to the current sector S_N (the sixth sector) according to the common index CIX_N−1 stored in the reverse-order column RSE_N (the sixth reverse-order column).

Next, in step S1062, the controller 160 writes the common index stored in a sixth sequential-order column corresponding to the sixth sector into a seventh sequential-order column corresponding to the seventh sector in the sequential-order table SE_TB. For example, in the embodiment of FIG. 7A, the controller 160 obtains that the sector read subsequent to the current sector S_2 (the sixth sector) is the sector S_1 (the seventh sector) in step S1060. Therefore, in step S1062, the controller 160 writes the common index CIX_3 stored in the sequential-order column SE_2 (the sixth sequential-order column) corresponding to the current sector S_2 (the sixth sector) into the sequential-order column SE_1 (the seventh sequential-order column) corresponding to the sector S_1 (the seventh sector). Namely, the controller 160 made the original sequential-order column SE_1 (the seventh sequential-order column) pointing to the sequential-order column SE_2 (the sixth sequential-order column) re-point to the sequential-order column SE_3 corresponding to the sector S_3 that is read prior to the first data mapping set. In the embodiment of FIG. 7B, the controller 160 obtains that the sector that is read subsequent to the current sector S_N (the sixth sector) is the sector S_N−1 (the seventh sector) in step S1060. Therefore, in step S1062, the controller 160 writes the value stored in the sequential-order column SE_N (the sixth sequential-order column) corresponding to the current sector S_N (the sixth sector) into the sequential-order column SE_N−1 (the seventh sequential-order column) corresponding to the sector S_N−1 (the seventh sector).

Next, in step S1064, the controller 160 obtains an eighth sector including the data mapping set that was read last from the cache area CA according to the head index HIX.

Next, in step S1065, the controller 160 determines whether the data mapping set stored in the sixth sector has gone the longest time without having been read from the cache area CA according to the tail index TIX. When the data mapping set stored in the sixth sector has gone the longest time without having been read from the cache area CA according to the tail index TIX, the process goes to step S1080, otherwise, the process goes to step S1066. Namely, the controller 160 determines whether the current data mapping set that is required to be read is the one that has gone the longest time without having been read in the cache area CA.

In step S1066, the controller 160 reads the sixth sequential-order column corresponding to the sixth sector to obtain a ninth common index of a ninth sector that is written prior to the sixth sector. In the embodiment of FIG. 7A, the controller 160 determines that the data mapping set TS_0 stored in the current sector S_2 (the sixth sector) is not the data mapping set that has gone the longest time without having been read in the cache area CA according to the tail index TIX in step S1065. Next, in step S1066, the controller 160 reads the sequential-order column SE_2 (the sixth sequential-order column) corresponding to the current sector S_2 (the sixth sector) to obtain that the sector S_3 (ninth sector) is the sector that was written prior to the sector S_2 (the sixth sector).

Next, in step S1068, the controller 160 writes the common index stored in the sixth reverse-order column into a ninth reverse-order column corresponding to the ninth common index. For example, in the embodiment of FIG. 7A, the controller 160 writes the common index CIX_1 stored in the reverse-order column RSE_2 (the sixth reverse-order column) corresponding to the current sector S_2 (the sixth sector) into the reverse-order column RSE_3 (the ninth reverse-order column) corresponding to the sector S_3 (the ninth sector) in step S1068.

Next, in step S1070, the controller 160 writes the common index of an eighth sequential-order column corresponding to the eighth sector in the sequential-order table SE_TB into the sixth sequential-order column corresponding to the sixth sector in the sequential-order column SE_0~SE_N. For example, in the embodiment of FIG. 7A, the controller 160 obtains a sector S_0 (the eighth sector) including the data mapping set TS_1 that was read last from the cache area CA according to the head index HIX of FIG. 6, and writes the common index CIX_0 of the sequential-order column SE_0 (the eighth sequential-order column) corresponding to the sector S_0 (the eighth sector) into the sequential-order column SE_2 (the sixth sequential-order column) corresponding to the current sector S_2 (the sixth sector) in step S1064.

Next, in step S1072, the controller 160 writes the common index of the sixth reverse-order column corresponding to the sixth sector of the reverse-order table RSE_TB into an eighth reverse-order column of the eighth sector that was read last in the reverse-order table RSE_TB. For example, in the embodiment of FIG. 7A, the controller 160 writes the common index CIX_2 of the reverse-order column RSE_2 (the sixth reverse-order column) corresponding to the current sector S_2 (the sixth sector) into the reverse-order column RSE_0 (the eighth reverse-order column) corresponding to the sector S_0 (the eighth sector) in step S1072.

Next, in step S1074, the controller 160 defines the head index HIX as a sixth common index of the sixth sequential-order column. For example, in the embodiment of FIG. 7A, the controller 160 defines the head index HIX as the common index CIX_2 of the current sector S_2, and keeps the tail index TIX as the common index CIX_N in step S1074.

Next, in step S1076, the controller 160 writes a specific value into the sixth reverse-order column. For example, in the embodiment of FIG. 7A, the controller 160 writes a specific value into the reverse-order column RSE_2 (the sixth reverse-order column) corresponding to the current sector S_2 (the sixth sector) in step S1076. Next, the process goes to step S1090.

In step S1080, the controller 160 writes the common index of an eighth sequential-order column corresponding to the eighth sector into the sixth sequential-order column corresponding to the sixth sector in the sequential-order table SE_TB. In the embodiment of FIG. 7B, the controller 160 determines that the data mapping set TS_2 stored in the sector S_N (the sixth sector) is not the data mapping set that has gone the longest time without having been read of the cache area CA according to the tail index TIX in step S1065. Next, in step S1080, the controller 160 reads the sequential-order column SE_2 (the sixth sequential-order column) corresponding to the current sector S_2 (the sixth sector) to obtain the sector S_3 (the ninth sector) that is read prior to the current sector S_2 (the sixth sector).

Next, in step S1082, the controller 160 writes the common index of the sixth reverse-order column corresponding to the sixth sector in the reverse-order table RSE_TB into an eighth reverse-order column of the eighth sector that was read last in the reverse-order table RSE_TB. For example, in the embodiment of FIG. 7B, the controller 160 has obtained that the last read sector is the sector S_0 (the eighth sector) in step S1064. Therefore, the controller 160 writes the common index CIX_N of the reverse-order column RSE_N (the sixth reverse-order column) corresponding to the current sector S_N (the sixth sector) into the reverse-order column RSE_0 (the eighth reverse-order column) corresponding to the sector S_0 (the eighth sector) in step S1082.

Next, in step S1084, the controller 160 defines the head index HIX as a sixth common index of the sixth sequential-order column, and defines the tail index TIX as a seventh common index of the seventh sector. For example, in the embodiment of FIG. 7B, the controller 160 defines the head index HIX as the common index CIX_2 of the current sector S_2 (the sixth sector), and keeps the tail index TIX as the common index CIX_N, in step S1084.

Next, in step S1086, the controller 160 writes a specific value into the sixth reverse-order column. Namely, the controller 160 writes the specific value into the reverse-order column RSE_N corresponding to the common index CIX_N pointed to by the head index. Next, the process goes to step S1090.

In step S1090, the controller 160 reads the first data mapping set from the cache area CA to perform the write command or the read command received in step S1000. The process ends at step S1090.

The data storage device 140 and the data maintenance method of the present invention can update the cache area according to the indexes, the reverse-order table, the sequential-order table and the cache-area mapping table, wherein columns that have to be rewritten in the process of updating the indexes, the reverse-order table and the sequential-order table account for fewer than five columns.

Data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a flash memory, comprising a plurality of blocks, each of blocks has a plurality of pages, each of the pages has a logical address and a physical address, the flash memory has a data mapping table arranged to record a plurality of mapping relationships between the logical addresses and the physical addresses, the data mapping table is divided into a plurality of data mapping sets, each of the data mapping sets has at least two of the mapping relationships, and each of the data mapping sets corresponds to a set index;
a random access memory, having a cache area, a sequential-order table, a reverse-order table and a cache-area mapping table, wherein the cache area has a plurality of sectors arranged to store part of the data mapping sets of the data mapping table, the cache-area mapping table has a plurality of sector-mapping columns arranged to record the set indexes of the data mapping sets of the cache area, the sequential-order table is arranged to record the order that the data mapping sets are read from the cache area, and the reverse-order table is arranged to record the opposite order that the data mapping sets are read from the cache area; and
further comprising a controller locating a first data mapping set of a first mapping relationship comprising the page indicated by a read command or a write command, and determining whether the first data mapping set has been uploaded into the cache area according to whether the cache-area mapping table has a first set index of the first data mapping set, wherein the first data mapping set is one of the data mapping sets, the first set index is one of the set indexes, and the first mapping relationship is one of the mapping relationships;
wherein each of the sectors corresponds sequentially to a plurality of common indexes, the sector-mapping columns of the cache-area mapping table correspond sequentially to the sectors of the cache area, the sequential-order table has a plurality of sequential-order columns corresponding sequentially to the sectors of the cache area, the reverse-order table has a plurality of reverse-order columns corresponding sequentially to the sectors of the cache area, and each of the sectors and the sector-mapping column, the sequential-order column, the reverse-order column have the same common index with the corresponding sector.

2. The data storage device as claimed in claim 1, wherein each of the sequential-order columns of the sequential-order table is arranged to store the common index of the sequential-order column that is read prior to the sector of the original sequential-order column.

3. The data storage device as claimed in claim 1, wherein each of the reverse-order columns of the reverse-order table is arranged to store the common index of the reverse-order column that is read subsequent to the sector of the original sequential-order column.

4. The data storage device as claimed in claim 1, wherein when the cache-area mapping table has the first set index, the controller reads the sector corresponding to the cache area according to the common index of the sector-mapping column having the first set index to obtain the first data mapping set, and reads the data of the first data mapping set from the random access memory to perform the write command or the read command.

5. The data storage device as claimed in claim 4, wherein the controller determines whether any of the sectors of the cache area is available when the cache-area mapping table does not have the first set index, wherein the controller reads the first data mapping set from the data mapping table stored in the flash memory and loads the first data mapping set into a first sector when the controller determines that the first sector of the cache area is available.

6. The data storage device as claimed in claim 4, wherein the random access memory further comprises a head index and a tail index, the head index is the common index of the sector that was read last from the cache area, and the tail index is the common index of the sector that has gone the longest time without having been read from the cache area.

7. The data storage device as claimed in claim 6, wherein when the controller determines that none of the sectors of the cache area is available, the controller determines which of the data mapping sets has gone the longest time without having been read from the cache area according to the tail index, and writes the data of the first data mapping set into the sector of the data mapping set that has gone the longest time without having been read from the cache area.

8. The data storage device as claimed in claim 6, wherein when the controller determines that none of the sectors of the cache area is available, the controller determines which of the sectors corresponds to the data mapping set that was read last from the cache area according to the head index for updating the sequential-order table and the reverse-order table.

9. A data maintenance method, applied to a data storage device of a flash memory, wherein the flash memory comprises a plurality of blocks, each of the blocks has a plurality of pages, each of the pages has a logical address and a physical address, and the data maintenance method comprises:
determining a read command or a write command;
locating a first data mapping set of a first mapping relationship corresponding to the page indicated by the read command or the write command;
determining whether the first data mapping set had been loaded on a cache area according to whether a cache-area mapping table has a first set index corresponding to the first data mapping set, wherein the cache-area mapping table has a plurality of sector-mapping columns corresponding sequentially to a plurality of sectors of the cache area;
determining whether any of the sectors of the cache area is available when the cache-area mapping table does not have a first set index;
performing a loading process when a first sector of the sectors of the cache area is available, wherein the loading process comprises:
reading the first data mapping set from a data mapping table stored in the flash memory to load the first data mapping set on the first sector; and writing the first set index of the first data mapping set into the sector-mapping column of the cache-area mapping table corresponding to the first sector corresponding; and reading the first data mapping set from the cache area to perform the write command or the read command;

wherein each of the sectors corresponds sequentially to a plurality of common indexes, wherein when the first sector is not the first one loaded from the cache area, the loading process further comprises:

obtaining a second sector belonging to the data mapping set that was read last from the data mapping set according to a head index;

writing the common index of a second sequential-order column of the sequential-order table corresponding to the second sector into the first sequential-order column of the first sector, wherein the sequential-order table has a plurality of sequential-order columns corresponding sequentially to the sectors of the cache area, and the first sequential-order column and the second sequential-order column are two of the sequential-order columns;

writing the common index of a first reverse-order column corresponding to the first sector of a reverse-order table into a second reverse-order column corresponding to the second sector of the reverse-order column, wherein the reverse-order table has a plurality of reverse-order columns corresponding sequentially to the sectors of the cache area, and the first reverse-order column and the second reverse-order column are two of the reverse-order columns;

defining a head index as a first common index corresponding to the first sector of the common indexes; and writing a specific value into the first reverse-order column of the reverse-order columns.

10. The data maintenance method as claimed in claim 9, wherein the data mapping table is arranged to record a plurality of mapping relationships between the logical addresses and the physical address of the pages, the data mapping table is divided into a plurality of data mapping sets, each of the data mapping sets has at least two of the mapping relationships, each of the data mapping set corresponds to a set index, the first data mapping set is one of the data mapping sets, and the first mapping relationship is one of the mapping relationships.

11. The data maintenance method as claimed in claim 10, wherein the sectors of the cache area are arranged to store a part of data mapping sets stored in the data mapping table, the sector-mapping columns of the cache-area mapping table are arranged to record the set indexes of the data mapping sets in the cache area.

12. The data maintenance method as claimed in claim 9, wherein the sectors correspond sequentially to the plurality of common indexes, wherein when the first sector is the first one loaded from the cache area, the loading process further comprises:

defining the head index as the first common index of the common indexes corresponding to the first sector; and defining a tail index as the first common index of the first sector.

13. The data maintenance method as claimed in claim 9, further comprising performing a replace process when none of the sectors of the cache area is available, and the replace process further comprises:

locating a third sector that has gone the longest time without having been read from the cache area according to a tail index;

writing the data of the first data mapping set into the third sector; and writing the first set index corresponding to the first data mapping set into the sector-mapping column corresponding to the third sector in the cache-area mapping table.

14. The data maintenance method as claimed in claim 13, wherein each of the sectors corresponds sequentially to the plurality of common indexes, and the replace process further comprises:

locating a fourth sector corresponding to the data mapping set that was read last from the cache area according to the head index;

writing the common index of a fourth sequential-order column corresponding to the fourth sector in a sequential-order table into a third sequential-order column corresponding to the third sector in the sequential-order table, wherein the sequential-order table has the plurality of sequential-order columns corresponding sequentially to the sectors of the cache area, the sequential-order column and the corresponding sector have the same common index, and the third sequential-order column and the fourth sequential-order column are two of the sequential-order columns;

writing the common index of a third reverse-order column corresponding to the third sector in a reverse-order table into a fourth reverse-order column corresponding to the fourth sector in the reverse-order table, wherein the reverse-order table has the plurality of reverse-order columns corresponding sequentially to the sectors of the cache area, the reverse-order column and the corresponding sector have the same common index, and the third reverse-order column and the fourth reverse-order column are two of the sequential-order columns;

reading the third reverse-order column to obtain the common index of a fifth reverse-order column of the reverse-order columns;

defining the head index as a third common index of the third sequential-order column; and defining the tail index as a fifth common index of the fifth reverse-order column;

writing the specific value into the third reverse-order column and a fifth sequential-order column corresponding to the fifth common index after defining the tail index as the fifth common index.

15. The data maintenance method as claimed in claim 9, wherein each of the sectors corresponds sequentially to the plurality of common indexes, and the data maintenance method further comprises performing an update process when a sixth sector of the cache-area mapping table has the first set index, wherein the update process further comprises:

reading a sixth reverse-order column corresponding to the sixth sector in a reverse-order table to obtain a seventh sector that is read subsequent to the sixth sector, wherein the reverse-order table has the plurality of reverse-order columns corresponding sequentially to the sectors of the cache area, the reverse-order column and the corresponding sector have the same common index, and the sixth reverse-order column is one of the reverse-order columns;

writing the common index stored in a sixth sequential-order column corresponding to the sixth sector into a seventh sequential-order column corresponding to the seventh sector in a sequential-order table, wherein the sequential-order table has the plurality of sequential-order columns corresponding sequentially to the sectors of the cache area, the sequential-order column and the corresponding sector have the same common index, and the sixth sequential-order column and the seventh sequential-order column are two of the sequential-order columns; and determining whether the sixth sector is the sector having the data mapping set that has gone the longest time without having been read from the cache area according to a tail index.

16. The data maintenance method as claimed in claim 15, wherein when the sector corresponding to the longest one of the data mapping sets that has gone the longest time without having been read from the cache area is the sixth sector, the update process further comprises:

obtaining an eighth sector corresponding to the data mapping set that was read last from the cache area according the head index;

writing the common index of an eighth sequential-order column corresponding to the eighth sector in the sequential-order table into the sixth sequential-order column corresponding to the sixth sector in the sequential-order column;

writing the common index of the sixth reverse-order column corresponding to the sixth sector in the reverse-order table into an eighth reverse-order column corresponding to the eighth sector in the reverse-order table;

defining the head index as a sixth common index of the sixth sequential-order column;

defining the tail index as a seventh common index corresponding to the seventh sector; and writing the specific value into the sixth reverse-order column.

17. The data maintenance method as claimed in claim 15, wherein each of the sectors corresponds sequentially to the plurality of common indexes, and when the sector corresponding to the data mapping set that has gone the longest time without having been read from the cache area is the sixth sector, the update process further comprises:

obtaining an eighth sector of the data mapping set that was read last from the cache area according to the head index;

reading the sixth sequential-order column to obtain a ninth common index of a ninth sector that is written prior to the sixth sector;

writing the common index stored in the sixth reverse-order column into a ninth reverse-order column corresponding to the ninth common index;

after the common index stored in the sixth reverse-order column is written into the ninth sequential-order column, writing the common index of an eighth sequential-order column corresponding to the eighth sector in the sequential-order table into the sixth sequential-order column corresponding to the sixth sector;

writing the common index of a sixth reverse-order column corresponding to the sixth sector in a reverse-order table into an eighth reverse-order column corresponding to the eighth sector in the reverse-order table;

defining the head index as a sixth common index of the sixth sequential-order column; and writing the specific value into the sixth reverse-order column.

18. The data maintenance method as claimed in claim 9, further comprises:

loading a part of a plurality of data mapping sets of the data mapping table on the cache area of a random access memory according to at least one read command or at least one write command when the flash memory is powered on, wherein each of the data mapping sets has at least two mapping relationships between the logical addresses and the physical addresses of the same pages, and each of the data mapping sets corresponds to a set index;

building the cache-area mapping table to record the set indexes corresponding to the data mapping sets in the cache area;

building the reverse-order table to record the opposite order that the data mapping sets are read from the cache area; and building the sequential-order table to record the order that the data mapping sets are read from the cache area.

19. The data maintenance method as claimed in claim 18, further comprising:

selecting one of a plurality of sectors from the cache area according to a tail index when the data mapping set that hasn't been loaded on the cache area has to be loaded on the cache area from the data mapping table and the cache area is filled;

loading the data mapping set that hasn't been loaded on the cache area on the selected sector; and updating the reverse-order table and the sequential-order table according to the head index, the original data of the reverse-order table and the original data of the sequential-order table after the data mapping set is loaded on the selected sector.

* * * * *